US011726639B2

(12) United States Patent
Motghare et al.

(10) Patent No.: US 11,726,639 B2
(45) Date of Patent: Aug. 15, 2023

(54) STOWING AND UNSTOWING BROWSER TABS IN GROUPS EACH CORRESPONDING TO A DIFFERENT SUBJECT

(71) Applicant: Microsoft Technology Licensing, LLC, Redmond, WA (US)

(72) Inventors: Neha Motghare, Hyderabad (IN); Kaustav Mukherjee, Hyderabad (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 297 days.

(21) Appl. No.: 15/586,184

(22) Filed: May 3, 2017

(65) Prior Publication Data

US 2018/0321804 A1 Nov. 8, 2018

(51) Int. Cl.
*G06F 3/0483* (2013.01)
*G06F 3/0482* (2013.01)
(Continued)

(52) U.S. Cl.
CPC .......... *G06F 3/0483* (2013.01); *G06F 3/0482* (2013.01); *G06F 3/04817* (2013.01); *G06F 16/957* (2019.01)

(58) Field of Classification Search
CPC .. G06F 3/0483; G06F 3/04817; G06F 3/0482; G06F 16/957
See application file for complete search history.

(56) References Cited

U.S. PATENT DOCUMENTS 5,694,561 A 12/1997 Malamud et al.
6,584,471 B1 * 6/2003 Maclin .................. G06Q 10/10
707/752

(Continued)

FOREIGN PATENT DOCUMENTS

WO 2016208916 A1 12/2016

OTHER PUBLICATIONS

Shanbhag, Akshata, "12 Incredibly Useful Ways to Manage Multiple Tabs in Firefox," http://www.makeuseof.com/tag/12-incredibly-useful-ways-manage-multiple-tabs-firefox/, Published on: Feb. 25, 2016, 24 pages.

(Continued)

*Primary Examiner* — Tan H Tran
(74) *Attorney, Agent, or Firm* — NovoTechIP International PLLC

(57) ABSTRACT

A facility for managing the displayed documents by an application is described. The facility displays a plurality of tabs each corresponding to a document loaded by the application. The facility receives a document stowing command in connection with a distinguished document to which one of the displayed tabs corresponds. For each of the documents to which a displayed tab corresponds, based on the contents of the document, the facility semantically determines one or more subjects of the distinguished document. At least in part in response to receiving the document stowing command in connection with the distinguished document, for each of two or more subjects determined for the distinguished document, the facility displays a visual indication of the determined subject. The facility receives user input selecting one of the displayed visual indications. The facility hides the tabs corresponding to the documents for which the subject indicated by the selected visual indication was semantically determined.

21 Claims, 25 Drawing Sheets

(51) Int. Cl.
*G06F 3/04817* (2022.01)
*G06F 16/957* (2019.01)

(56) References Cited

U.S. PATENT DOCUMENTS

| | | | |
|---|---|---|---|
| 7,774,366 B2 | 8/2010 | Fisher et al. | |
| 8,191,007 B1* | 5/2012 | Veloz, III | G06F 17/30899 |
| | | | 715/764 |
| 8,375,321 B2 | 2/2013 | Cruz Moreno et al. | |
| 8,407,612 B2 | 3/2013 | Cruz Moreno et al. | |
| 9,971,847 B2* | 5/2018 | Bhupatiraju | G06F 16/9577 |
| 2006/0271861 A1* | 11/2006 | Yolleck | H04L 63/1483 |
| | | | 715/760 |
| 2007/0186176 A1 | 8/2007 | Godley | |
| 2007/0220441 A1* | 9/2007 | Melton | G06F 17/30876 |
| | | | 715/781 |
| 2008/0184137 A1 | 7/2008 | Grimm et al. | |
| 2008/0301562 A1 | 12/2008 | Berger et al. | |
| 2009/0327947 A1 | 12/2009 | Schreiner et al. | |
| 2010/0115450 A1* | 5/2010 | Scott | G06F 3/0483 |
| 2012/0131485 A1* | 5/2012 | Svendsen | G06F 3/0483 |
| | | | 715/769 |
| 2013/0205194 A1* | 8/2013 | Decker | G06F 17/21 |
| | | | 715/234 |
| 2014/0164960 A1* | 6/2014 | Kuo | G06F 16/957 |
| | | | 715/760 |
| 2014/0245178 A1* | 8/2014 | Smith | H04L 51/16 |
| | | | 715/753 |
| 2014/0304615 A1* | 10/2014 | Coe | G06F 3/04842 |
| | | | 715/752 |
| 2015/0346929 A1 | 12/2015 | Karunamuni et al. | |
| 2016/0070731 A1 | 3/2016 | Chang et al. | |
| 2019/0258691 A1* | 8/2019 | Romanenko | G06F 3/048 |

OTHER PUBLICATIONS

Al-Ghuribi, et al., "A Simple Study of Webpage Text Classification Algorithms for Arabic and English Languages," In Proceedings of International Conference on IT Convergence and Security, Dec. 16, 2013, 5 pages.
Pinola, Melanie, "Top 10 Tips and Tools for Managing Too Many Browser Tabs," https://zapier.com/blog/chrome-firefox-tab-extensions/, Published on: Nov. 8, 2016, 15 pages.
"Add-ons," https://addons.mozilla.org/en-US/firefox/addon/tab-groups-panorama/, Retrieved on: Mar. 2, 2017, 6 pages.
Goldman, Joshua, "How to Hide all Browser Tabs with One Click", Retrieved From: https://www.cnet.com/how-to/how-to-hide-all-browser-tabs-with-one-click/, Dec. 30, 2011, 3 Pages.
"International Search Report and Written Opinion Issued in PCT Application No. PCT/US2018/028757", dated Aug. 8, 2018, 14 Pages.
Taylor, Gabrielle, "How to Hide All Your Browser Tabs with One Click in Chrome, Safari, Opera, and Firefox Internet Gadget Hacks", Retrieved From: https://internet.gadgethacks.com/how-to/hide-all-your-browser-tabs-with-one-click-chrome-safari-opera-and-firefox-0141165/, Jan. 4, 2013, 3 Pages.

* cited by examiner

FIG. 9 page stowing table — 900

| URL | direct subject | subject path | stowed |
|---|---|---|---|
| www.legends.com/baseball | baseball | baseball -> sports | no |
| www.epic-ure.com/tacos | tacos | tacos -> Mexican food -> food | no |
| sportsbios.com/willie_mays | Willie Mays | Willie Mays -> baseball -> sports | no |
| www.livesports.info/cricket | cricket | cricket -> sports | no |
| golffan.com/records | golf | golf -> sports | no |
| www.aboutsports.com/cricket/rules | cricket | cricket -> sports | no |
| greatamericanpastime.com | baseball | baseball -> sports | no |

901, 902, 903, 904, 905, 906, 907
911, 912, 913, 914 page stowing table ─1300

| URL | direct subject | subject path | stowed |
|---|---|---|---|
| www.legends.com/baseball | baseball | baseball -> sports | yes |
| www.epic-ure.com/tacos | tacos | tacos -> Mexican food -> food | no |
| sportsbios.com/willie_mays | Willie Mays | Willie Mays -> baseball -> sports | yes |
| www.livesports.info/cricket | cricket | cricket -> sports | no |
| golffan.com/records | golf | golf -> sports | no |
| www.aboutsports.com/cricket/rules | cricket | cricket -> sports | no |
| greatamericanpastime.com | baseball | baseball -> sports | yes |

| URL | direct subject | subject path | stowed |
|---|---|---|---|
| www.legends.com/baseball | baseball | baseball -> sports | yes |
| www.epic-ure.com/tacos | tacos | tacos -> Mexican food -> food | no |
| sportsbios.com/willie_mays | Willie Mays | Willie Mays -> baseball -> sports | yes |
| www.livesports.info/cricket | cricket | cricket -> sports | yes |
| golffan.com/records | golf | golf -> sports | yes |
| www.aboutsports.com/cricket/rules | cricket | cricket -> sports | yes |
| greatamericanpastime.com | baseball | baseball -> sports | yes | page stowing table 1700

*FIG. 17*

| URL | direct subject | subject path | stowed |
|---|---|---|---|
| www.legends.com/baseball | baseball | baseball -> sports | yes |
| www.epic-ure.com/tacos | tacos | tacos -> Mexican food -> food | no |
| sportsbios.com/willie_mays | Willie Mays | Willie Mays -> baseball -> sports | yes |
| www.livesports.info/cricket | cricket | cricket -> sports | no |
| golffan.com/records | golf | golf -> sports | yes |
| www.aboutsports.com/cricket/rules | cricket | cricket -> sports | no |
| greatamericanpastime.com | baseball | baseball -> sports | yes |

*FIG. 20*

| URL | direct subject | subject path | stowed |
|---|---|---|---|
| www.legends.com/baseball | baseball | baseball -> sports | yes |
| www.epic-ure.com/tacos | tacos | tacos -> Mexican food -> food | no |
| sportsbios.com/willie_mays | Willie Mays | Willie Mays -> baseball -> sports | yes |
| www.livesports.info/cricket | cricket | cricket -> sports | no |
| golffan.com/records | golf | golf -> sports | yes |
| www.aboutsports.com/cricket/rules | cricket | cricket -> sports | no |
| greatamericanpastime.com | baseball | baseball -> sports | yes |
| recipeprovince.com/al_pastor | tacos | tacos -> Mexican food -> food | yes |

FIG. 23

STOWING AND UNSTOWING BROWSER TABS IN GROUPS EACH CORRESPONDING TO A DIFFERENT SUBJECT

BACKGROUND

Browsers are applications that display web pages and other documents. These web pages and other documents can be loaded from a remote web server, a local web server, a local file system, etc.

Many browsers allow users to have multiple web pages loaded simultaneously. In order to enable a user to navigate among multiple simultaneously-loaded web pages, in a single browser window, a conventional "tabbed browser" displays for each loaded web page a small control called a "tab" that the user can activate in order to replace a single web page currently displayed in the browser window with the web page to which the activated tab corresponds. By activating different tabs in turn, a user can step through the display of some or all of the loaded web pages.

It is typical for a tab to include at least part of the name of the web page which it corresponds. Tabs are often initially arranged in the order in which the corresponding web pages were loaded, and can typically be manually rearranged into a different order by the user.

SUMMARY

A facility for managing the displayed documents by an application is described. The facility displays a plurality of tabs each corresponding to a document loaded by the application. The facility receives a document stowing command in connection with a distinguished document to which one of the displayed tabs corresponds. For each of the documents to which a displayed tab corresponds, based on the contents of the document, the facility semantically determines one or more subjects of the distinguished document. At least in part in response to receiving the document stowing command in connection with the distinguished document, for each of two or more subjects determined for the distinguished document, the facility displays a visual indication of the determined subject. The facility receives user input selecting one of the displayed visual indications. The facility hides the tabs corresponding to the documents for which the subject indicated by the selected visual indication was semantically determined.

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

BRIEF DESCRIPTION OF THE DRAWINGS

FIG. 9 is a data structure diagram showing sample contents of a page stowing table used by the facility in some examples to store information used by the facility to stow and unstow web pages loaded by a particular browser instance.

FIG. 13 is a data structure diagram showing sample contents of the page stowing table updated to reflect the user's stowing of three web pages directed to the "baseball" subject.

FIG. 17 is a data structure diagram showing sample contents of the page stowing table updated to reflect the user's selection of the sports category from the Stow Tab context menu item extension shown in FIG. 16.

FIG. 20 is a data structure diagram showing sample contents of the page stowing table updated to reflect the unstowing of two web pages having the "cricket" subject in response to the user's selection of the cricket subject shown in FIG. 19.

FIG. 23 is a data structure diagram showing sample contents of the page stowing table updated to reflect activation of the open and stow control for a link.

DETAILED DESCRIPTION

Figure 1:
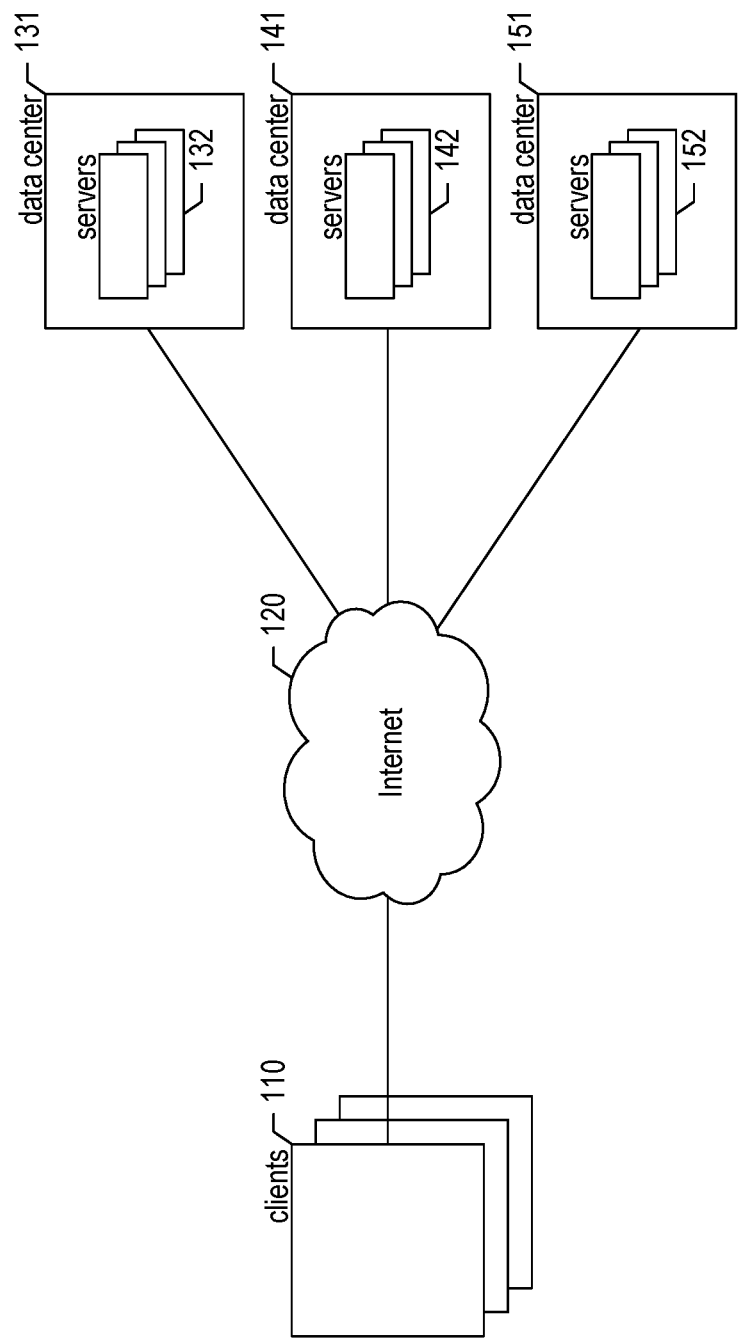
FIG. 1 is a network diagram showing an environment in which the facility operates in some examples.

The inventors have identified important disadvantages in how browsers conventionally manage loaded web pages. In particular, the inventors have noted that, as users become more accustomed to tabbed browsers, it has become common for them to load large numbers of web pages at a time—such as 10, 25, or even 50 web pages. In some cases, this reflects a strategy on a user's part to keep track of all of the web pages that interest the user until the user eventually has time to read them. The inventors have recognized that, as the number of web pages that are loaded at the same time increases, it becomes increasingly difficult and time-consuming for a user to find among these loaded web pages one or more web pages that s/he wishes to read at a particular time.

In response to this recognition, the inventors have conceived and reduced to practice a software and/or hardware facility for stowing and unstowing browser tabs and their corresponding loaded web pages based on subjects to which they are directed ("the facility"). These subjects are also sometimes referred to as "categories" herein.

Each time a browser loads a web page into a browser tab, the facility determines one or more subjects to which the web page relates. The user can operate a "stow" control with respect to a particular tab to display a list of the one or more subjects to which the web page contained in the tab relates; when the user selects one of the subjects on this list, the facility hides all of the tabs that contain documents relating to the selected subject. The user can also operate a stow control with respect to the entire browser window to display a list of the subjects to which any of the open web pages in unhidden tabs relate; when the user selects one of the subjects on this list, the facility hides all of the tabs that contain documents relating to the selected subject. Finally, the user can operate an "unstow" control with respect to the entire browser window to display a list of the subjects to which the documents contained by any of the hidden tabs relate; when the user selects one of the subjects on this list, the facility unhides all of the hidden tabs that contain documents relating to the selected subject. In some cases, these displayed lists of subjects include a count of the number of tabs that will be hidden or unhidden if each subject is selected. In some cases, the facility only displays the unstow control when one or more tabs are hidden, or visually emphasizes the unstow control when one or more tabs are hidden. Also, in some examples, in the context menu displayed for a link in an open web page, the facility includes an entry to specify opening the web page that is the subject of the link in a new tab and immediately hiding this tab. Alternatively or in addition, the user can hold down a particular command key on the keyboard when clicking on the link to achieve the same result.

In some examples, for each loaded web page, the facility determines a "direct subject" to which the web page is primarily directed, as well as a "subject path" of one or more higher-level, more general subjects to which the web page is directed.

In some examples, the facility uses named entities to attribute direct categories and subject paths to loaded web pages. In particular, in some examples, to use named entities to attribute a direct subject to a web page, the facility identifies named entities referenced in the web page, and analyzes entity relationship graphs each specifying relationships between one of these referenced named entities and other named entities related to the referenced named entity. The named entities whose references the facility identifies in the web page are ways of referring to real-world objects, such as the names of people, organizations, or locations; the names of substances or biological species; other "rigid designators;" expressions of times, quantities, monetary values, or percentages; etc. For each named entity reference in the web page, the facility retrieves or constructs an entity relationship graph: a data structure specifying direct and indirect relationships between the referenced named entity and other, more general named entities related to the referenced one. In each entity relationship graph, the referenced named entity is described as the "root" of the graph. The facility compares the entity relationship graphs for the named entities referenced by the web page, and selects as the direct category of the web page an entity that occurs in all or most of these entity relationship graphs, at a relatively short average distance from their roots. (As the distance of entities from the root increases, the entities grow increasingly more general and less specific, and less strongly related to the reference entity of the graph's root.) To attribute a subject path to the web page, the facility traverses one of the graphs containing the direct subject selected for the web page from the direct subject entity to the leaf entity that is a descendent of the direct subject entity.

By performing in some or all of these ways, the facility makes it easy for a user to organize and access a particular subject. In this way, the facility relieves the user of the burden conventionally imposed on the user to manually locate and rearrange web pages relating to a particular subject, allowing them to read web pages that are, in many cases, more relevant to their interest, and in less time, than they could using conventional techniques.

Also, by performing in some or all of the ways described above and storing, organizing, and accessing information relating to web page categorization in efficient ways, the facility meaningfully reduces the hardware resources needed to store and exploit this information, including, for example: reducing the amount of storage space needed to store the information relating to web page categorization; and reducing the number of processing cycles needed to store, retrieve, or process the information relating to web page categorization. This allows programs making use of the facility to execute on computer systems that have less storage and processing capacity, occupy less physical space, consume less energy, produce less heat, and are less expensive to acquire and operate. Also, such a computer system can respond to user requests pertaining to information relating to web page categorization with less latency, producing a better user experience and allowing users to do a particular amount of work in less time.

FIG. 1 is a network diagram showing an environment in which the facility operates in some examples. The network diagram shows clients 110 each typically being used by different user. Each of the clients execute software enabling its user to interact with documents, such as a browser enabling its user to interact with web page documents. The clients are connected by the Internet 120 and/or one or more other networks to data centers such as data centers 131, 141, and 151, which in some examples are distributed geographically to provide disaster and outage survivability, both in terms of data integrity and in terms of continuous availability. Distributing the data center geographically also helps to minimize communications latency with clients in various geographic locations. Each of the data centers contain servers, such as servers 132, 142, and 152. Each server can perform one or more of the following: serving content and/or bibliographic information for documents; and storing information about relationships between named entities.

While various examples of the facility are described in terms of the environment outlined above, those skilled in the art will appreciate that the facility may be implemented in a variety of other environments including a single, monolithic computer system, as well as various other combinations of computer systems or similar devices connected in various ways. In various examples, a variety of computing systems or other different devices are used as clients, including desktop computer systems, laptop computer systems, automobile computer systems, tablet computer systems, smart phones, personal digital assistants, televisions, cameras, etc.

Figure 2:
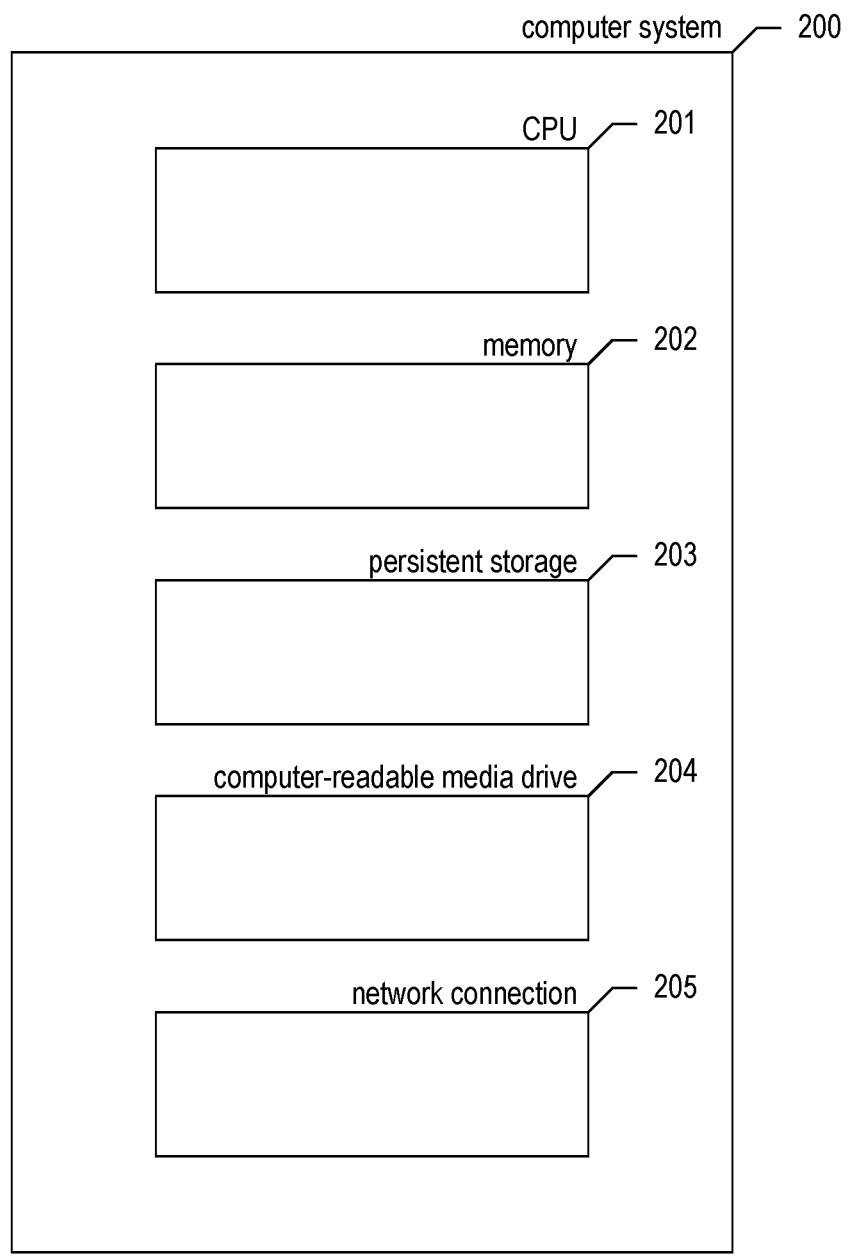
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various examples, these computer systems and other devices 200 can include server computer systems, desktop computer systems, laptop computer systems, netbooks, mobile phones, personal digital assistants, televisions, cameras, automobile computers, electronic media players, etc. In various examples, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, rootrs, repeaters, electrical cables and optical fibers, light emitters and receivers, radio transmitters and receivers, and the like. While computer systems con Figured as described above are typically used to support the operation of the facility, those skilled in the art will appreciate that the facility may be implemented using devices of various types and configurations, and having various components.

Figure 3:
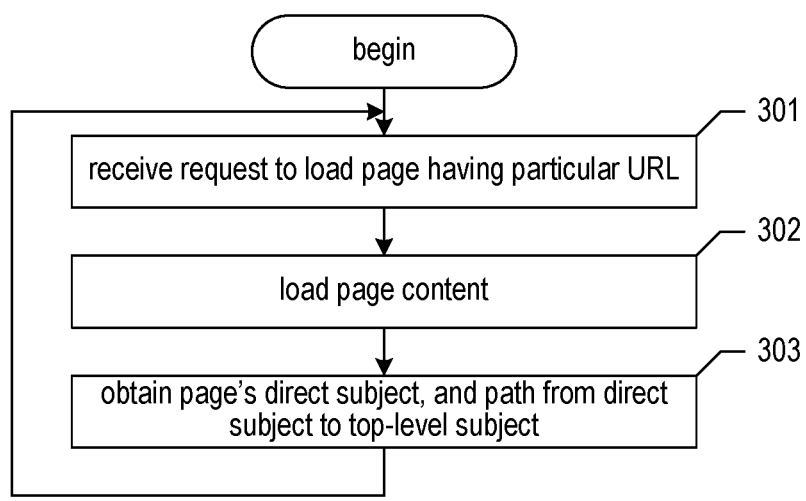
FIG. 3 is a flow diagram showing a process performed by the facility in some examples to process requests to load web pages.

FIG. 3 is a flow diagram showing a process performed by the facility in some examples to process requests to load web pages. At 301, the facility receives a request to load a web page having a particular URL. Such requests may correspond, for example, to the user typing the URL into a URL field of a browser; a user activating a hyperlink storing the URL that occurs in a web page, email message, text message; etc. At 302, the facility uses conventional techniques to load the content of the web page, based upon its URL. In some examples (not shown), the facility uses the loaded page content to render the page, such as in a browser window. At 303, the facility obtains a direct subject for the page, as well as a path from that direct subject to a top-level subject for the page. In some examples, the facility obtains this information at 303 by performing the process shown in FIG. 4 and discussed below. After 303, the facility continues at 301 to receive and process the next request.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 4:
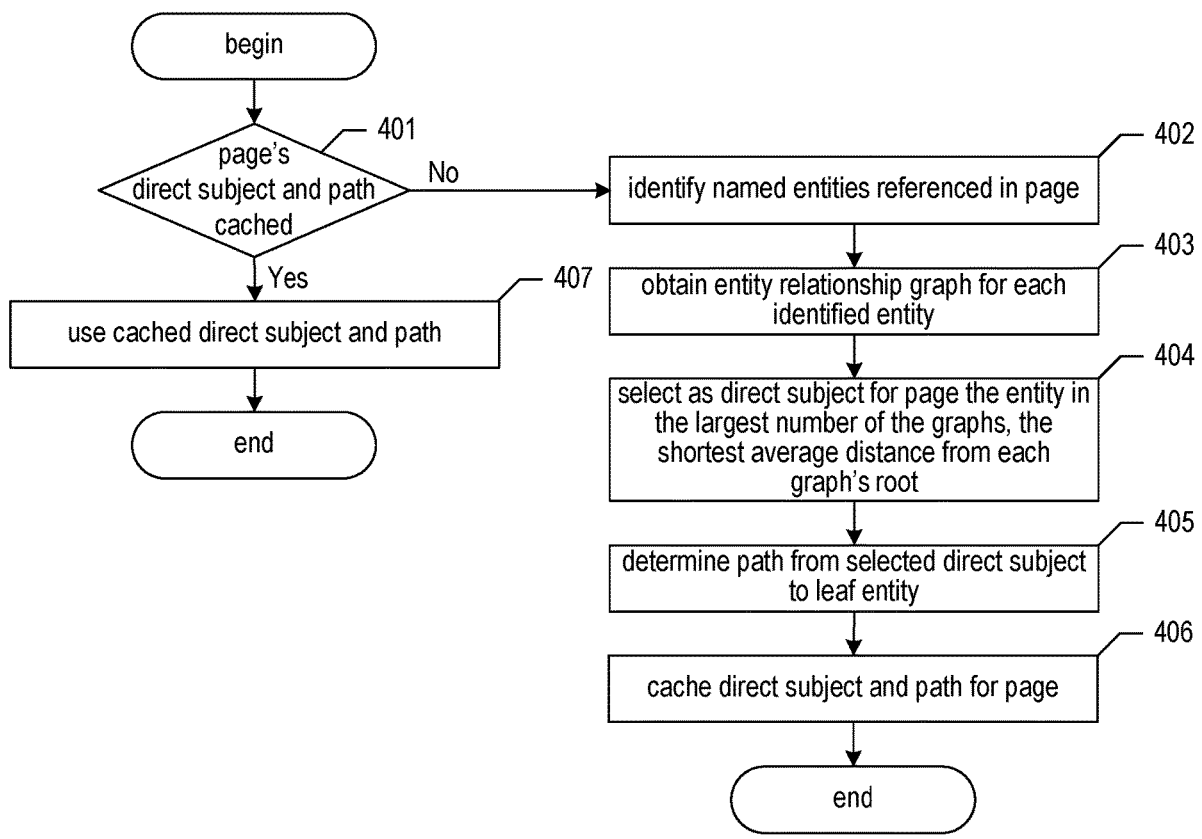
FIG. 4 is a flow diagram showing a process performed by the facility in some examples to determine a direct subject for a web page, and a path from that direct subject to a top-level subject for the web page.

FIG. 4 is a flow diagram showing a process performed by the facility in some examples to determine a direct subject for a web page, and a path from that direct subject to a top-level subject for the web page. At 401, if the web page's direct subject and path have been cached, such as being cached on a server accessible to a browser installed on a large number of clients, then the facility continues at 407, else the facility continues at 402. At 402, the facility identifies named entities that are referenced in the web page, such as by comparing the content of the current web page to a list of named entities and various alternative forms of expression of each. At 403, the facility obtains an entity relationship graph for each named entity identified at 402.

In some examples, this involves retrieving an existing entity relationship graph for an identified entity. In some examples, this involves constructing an entity relationship graph for an identified entity. For example, in some examples, the facility uses a service such as MICROSOFT SATORI from MICROSOFT CORPORATION to return child entities of a queried entity, as follows: (1) the facility establishes the identified entity as the root of the entity relationship graph; (2) the facility queries for child entities of the identified entity, and adds then to the entity relationship graph as children of the root; and (3) for each of the children added to the entity relationship graph, the facility recursively queries for their children and adds them to the entity relationship graph until no more children of the root remain to be added to the entity relationship graph. In the completed entity relationship graph, the root is the most specific subject that will be a can be attributed to the web page, and the "leaf nodes" that have no children are the least specific, most general subjects that can be attributed to the web page.

FIGS. 5-8 show sample entity relationship graphs obtained by the facility for the named entities "baseball," "Babe Ruth," "Jackie Robinson," and "Hank Aaron," which are all referenced by a first web page in an example set of web pages all loaded by a single user.

Figure 5:
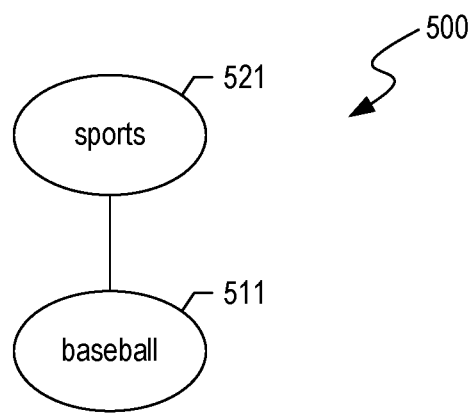
FIG. 5 is a graph diagram showing a sample entity relationship graph for the named entity "baseball" retrieved or constructed by the facility in some examples.

FIG. 5 is a graph diagram showing a sample entity relationship graph for the named entity "baseball" retrieved or constructed by the facility in some examples. In entity relationship graph 500, root node 511 is a "baseball" entity. Child node 521 from root node 511 is a "sports" entity. Because node 511 has no children, it is a leaf node.

Figure 6:
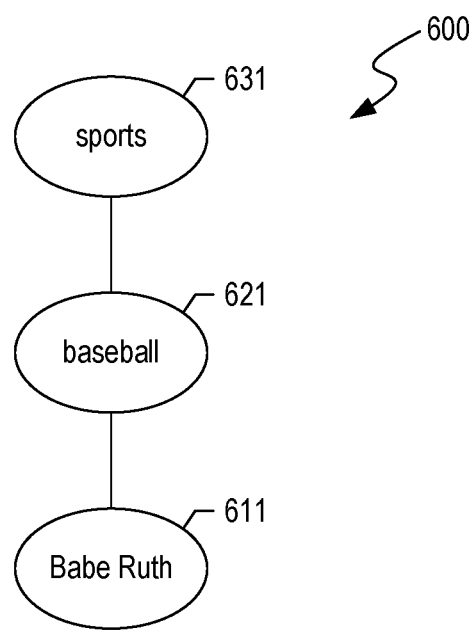
FIG. 6 is a graph diagram showing a sample entity relationship graph for the named entity "Babe Ruth" retrieved or constructed by the facility in some examples.

FIG. 6 is a graph diagram showing a sample entity relationship graph for the named entity "Babe Ruth" retrieved or constructed by the facility in some examples. In entity relationship graph 600, root node 611 is a "Babe Ruth" entity. Root node 611 has child node 621, a "baseball" entity. Node 621 has child node 631, a "sports" entity that is a leaf node.

Figure 7:
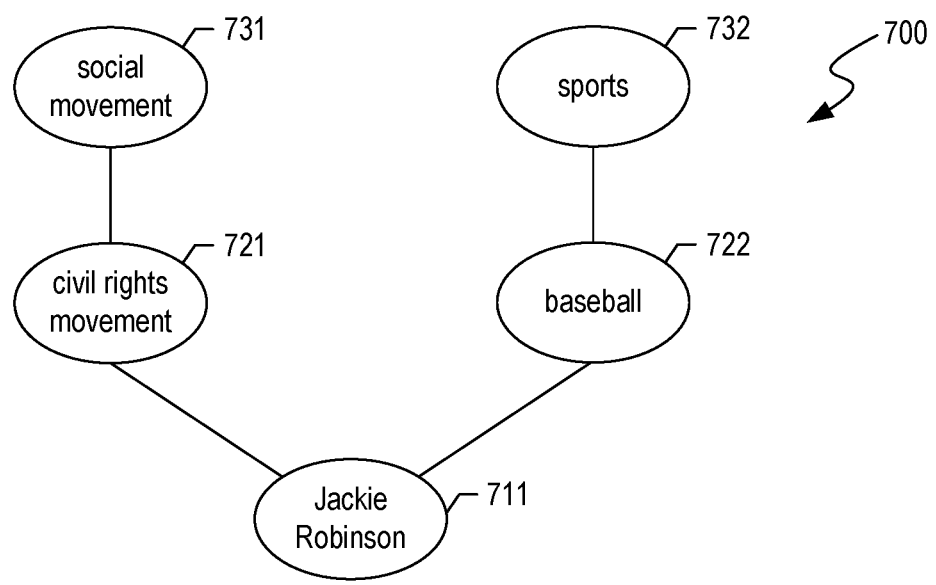
FIG. 7 is a graph diagram showing a sample entity relationship graph for the named entity "Jackie Robinson" retrieved or constructed by the facility in some examples.

FIG. 7 is a graph diagram showing a sample entity relationship graph for the named entity "Jackie Robinson" retrieved or constructed by the facility in some examples. In entity relationship graph 700, root node 711 is a "Jackie Robinson" entity, and has two children: "civil rights movement" entity 721, and "baseball" entity 722. Node 721 has child node 731 for a "social movement" entity, which is a leaf node. Node 722 has a child entity 732, "sports," which is a leaf node.

Figure 8:
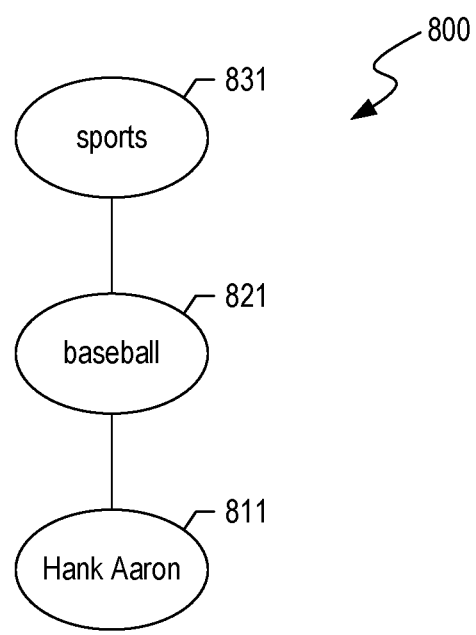
FIG. 8 is a graph diagram showing a sample entity relationship graph for the named entity "Hank Aaron" retrieved or constructed by the facility in some examples.

FIG. 8 is a graph diagram showing a sample entity relationship graph for the named entity "Hank Aaron" retrieved or constructed by the facility in some examples. In entity relationship graph 800, root node 811 is for a "Hank Aaron" entity. Node 811 has child node 821 for a "baseball" entity. Node 821 has a child node 831 for a "sports" entity, which is a leaf node.

Returning to FIG. 4, at 404, the facility selects as the direct subject for the web page the entity that is in the largest number of the graphs obtained at 403, the shortest average distance from each graph's root. Considering the first sample web page, for which the facility obtained the four entity relationship graphs shown in FIGS. 5-8, the following entities are common to all four graphs: "sports" and "baseball." Of these two entities, the one having the shortest average distance from each graph's root is "baseball," which has an average distance from the root of 0.75, as compared to "sports," which has an average distance of 1.75. Accordingly, the facility selects "baseball" as the direct subject for the web page.

At 405, the facility determines the path from the direct subject selected for the web page at 404 to the leaf entity that is a descendent of the direct subject entity. In terms of the example, looking, for example, at FIG. 7, traversing from "baseball" entity 722 to the descendent leaf entity 732 creates the path "baseball→sports". At 406, the facility caches the direct subject and subject path determined for the web page at 405 to allow this information to be immediately used for future retrievals of the web page by any browser instance associated with the facility. After 406, this process concludes.

At 407, where the web page; direct subject in path are already cached, the facility uses the cached direct subject and path. After 407, this process concludes.

The operation of the facility is discussed below in connection with a more extensive example. In this example, in a single browser instance, a particular user loads seven web pages whose URLs are shown below in Table 1.

TABLE 1 www.legends.com/baseball
www.epic-ure.com/tacos
sportsbios.com/willie_mays
www.livesports.info/cricket
golffan.com/records
www.aboutsports.com/cricket/rules
greatamericanpastime.com FIG. 9 is a data structure diagram showing sample contents of a page stowing table used by the facility in some examples to store information used by the facility to stow and unstow web pages loaded by a particular browser instance. The page stowing table 900 is made up of rows, here rows 901-907, each corresponding to a different web page that is presently loaded by the browser instance to which the page stowing table corresponds. Each row is divided into the following columns: a URL column 911 containing information identifying the web page to which the row corresponds, such as a URL that can be used to retrieve this web page; a direct subject column 912 identifying a direct subject selected for the web page to which the row corresponds; a subject path column 913 containing the path between the direct subject selected for the web page and the entity relationship graph leaf that descends from the direct subject entity; and a stowed column 914 indicating whether the web page is presented stowed. For example, row 903 indicates that a web page that can be retrieved using the URL "sportsbios.com/willie_mays" has the direct subject "Willie Mays," has the subject path "Willie Mays→baseball→sports," and is not presented stowed. The state of page stowing table 900 reflects the state of the facility after loading the seven web pages identified in Table 1 at a time when none of these web pages is stowed.

While FIG. 9 and each of the data structure diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

Figure 10:
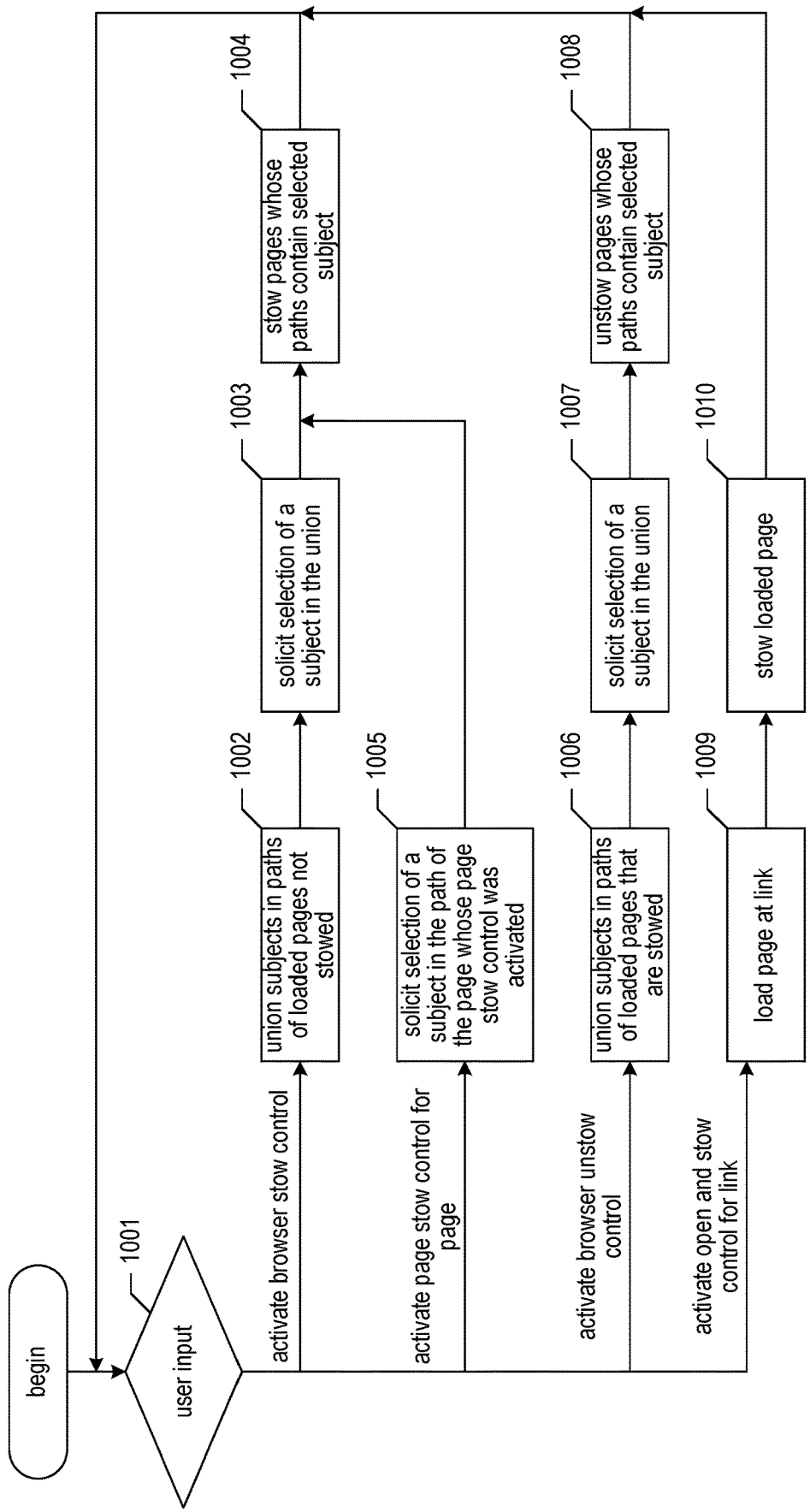
FIG. 10 is a flow diagram showing a process performed by the facility in some examples to stow and unstow web pages loaded by a browser instance.

FIG. 10 is a flow diagram showing a process performed by the facility in some examples to stow and unstow web pages loaded by a browser instance. FIG. 10 is discussed below in connection with a continuation of the example depicted in FIG. 9.

At 1001, at a time when a browser instance is executing and displayed, the facility receives user input directed to the browser. If the user input received at 1001 is input that activates a browser stow control, then the facility continues at 1002; if the received input is input that activates a page stow control for a particular page, then the facility continues at 1005; if the received input is input that activates a browser unstow control, then the facility continues at 1006; and if the received in put is input that activates an Open and Stow control for a particular link, then the facility continues at 1009.

Figure 11:
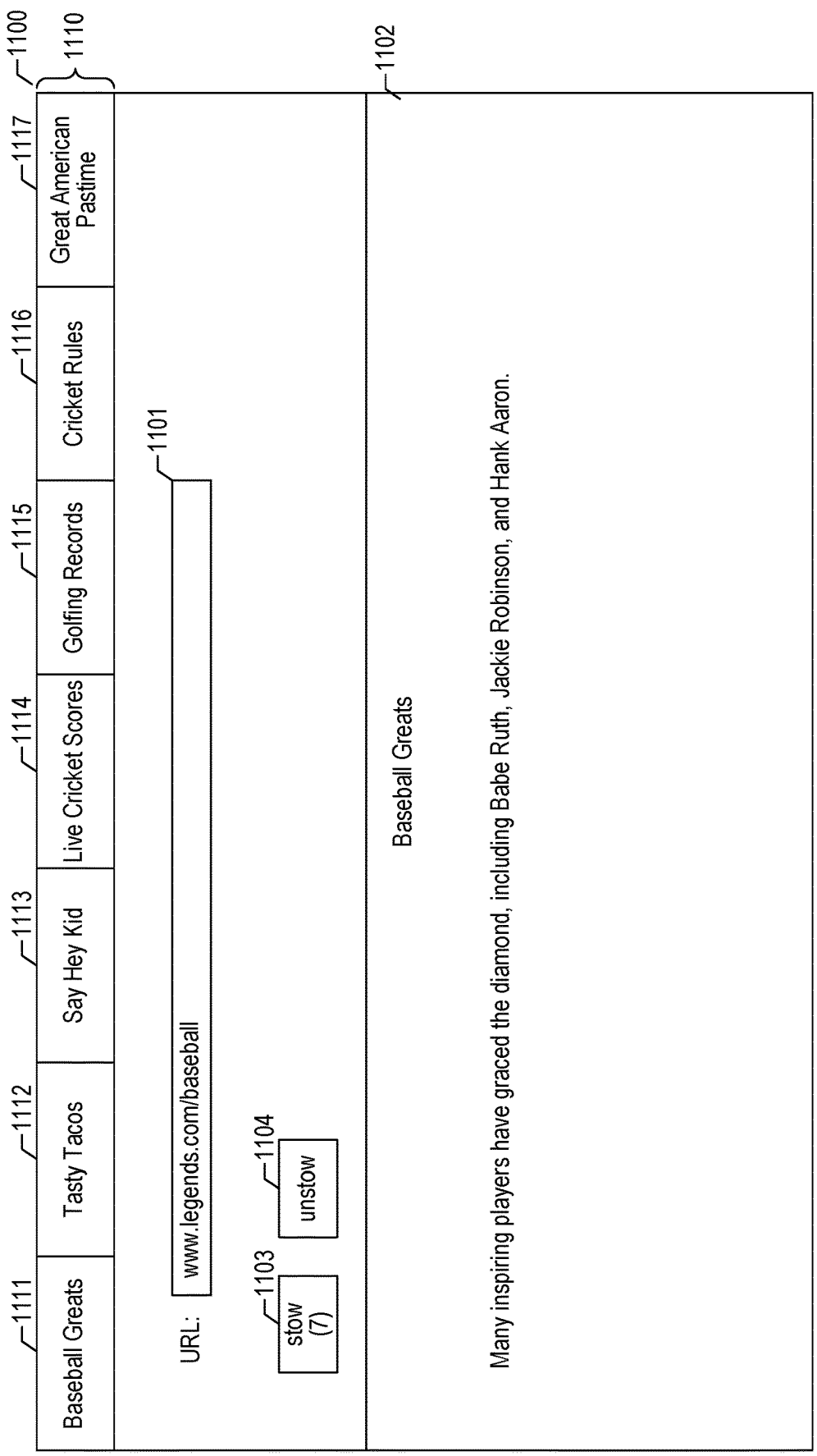
FIG. 11 is a user interface diagram showing a sample display presented by the facility in some examples that shows a browser stow control.

FIG. 11 is a user interface diagram showing a sample display presented by the facility in some examples that shows a browser stow control. A browser window 1100 includes a URL field 1101 containing a URL that can be used to retrieve web page 1102. The browser window also includes a browser stow control 1103 and a browser unstow control 1104. It can be seen that the browser stow control 1103 bears the number "7," indicating that there are seven loaded web pages that are not presented stowed, and that are available to stow. The window further includes web page tabs 1111-1117 in a web page tab bar 1110. In some examples, the user can select any of these web page tabs in order to switch to displaying the corresponding web page and its URL. Presently, web page tab 1111 is selected, and thus URL 1101 and web page 1102 correspond to this tab. While this display is being presented, the user can activate browser stow control 1103, such as by performing a mouse click over it, touching it on the screen, speaking a command such as "stow," typing a particular keystroke or keystroke combination, choosing a particular item from a particular menu, etc.

Returning to FIG. 10, when the user activates the browser stow control, at 1002, the facility unions the subjects in the paths of the loaded pages not stowed. When the browser stow control is activated at a time when the page stowing table has the content shown in FIG. 9, this union is performed by collecting all of the unique subjects in column 913 of the page stowing table 900, as all of the rows have open "no" in stow column 914: "baseball," "sports,"

"tacos," "Mexican food," "food," "Willie Mays," "Cricket," and "golf." At 1003, the facility solicits the user's selection of a subject in the union of subjects obtained at 1002.

Figure 12:
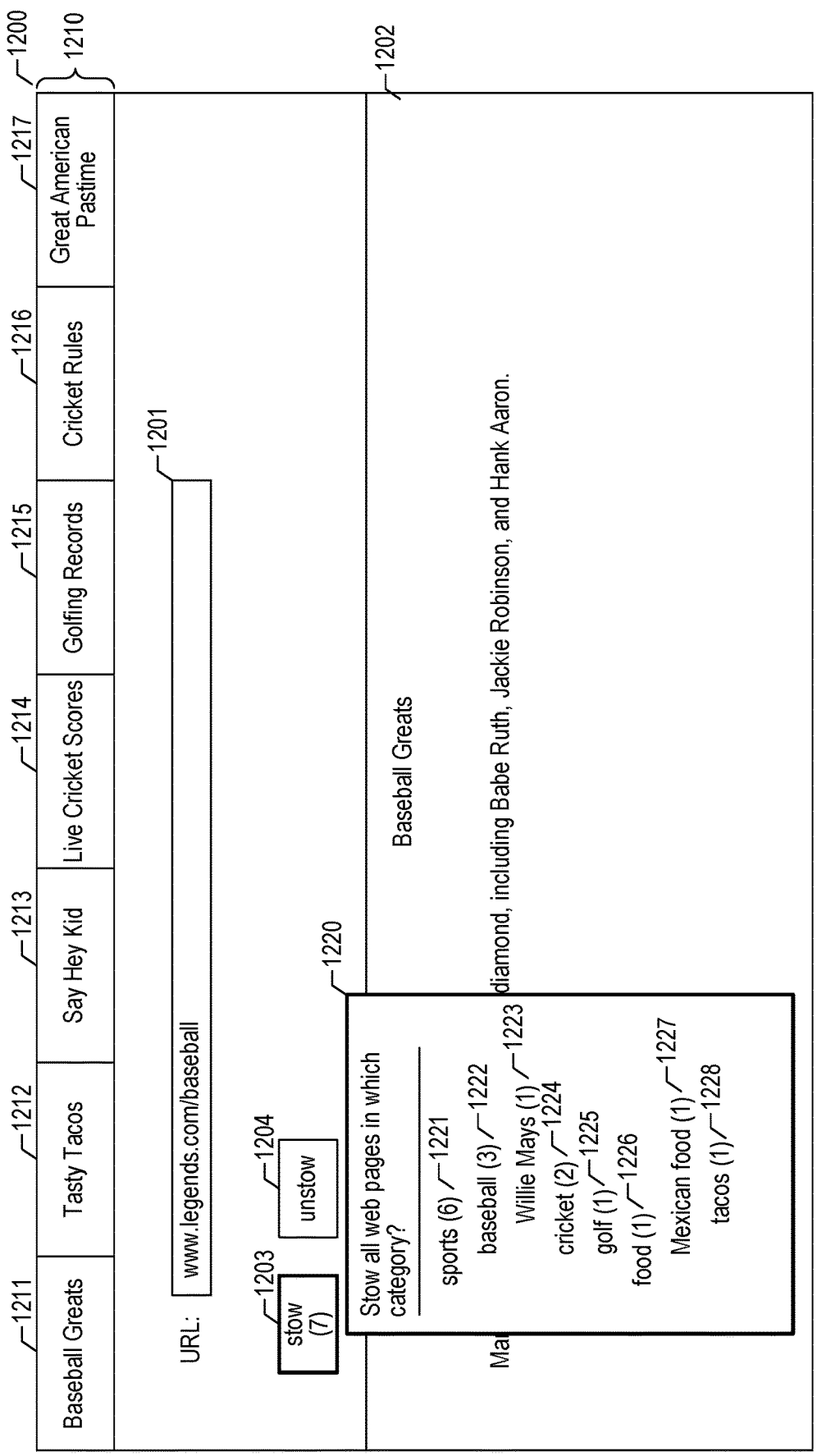
FIG. 12 is a user interface diagram showing a sample display presented by the facility and some examples to solicit the user's selection of a subject in the union of subjects.

FIG. 12 is a user interface diagram showing a sample display presented by the facility and some examples to solicit the user's selection of a subject in the union of subjects. It can be seen in browser window 1200 that, upon activation of a browser stow control 1203, the facility has displayed a subject pane (or "category pane") 1220. The category pane includes the union of subjects 1221-1228 obtained at 1002. As shown, these subjects are organized in a hierarchy corresponding to the entity relation graphs, and parenthetical indications of the number of web pages that fall into each category and are not stowed are included. For example, category 1222 indicates that there are three web pages directed to the subject or category "baseball" that are not stowed. The user can select one of these subjects 1221-1228, such as in any of the ways described above, using the up and down arrow keys and return key, etc.

Returning to FIG. 10, the facility stows each web page whose subject path contains the subject selected at 1003 and is not already stowed. After 1004, the facility continues at 1001 to receive and process the next user input.

FIG. 13 is a data structure diagram showing sample contents of the page stowing table updated to reflect the user's stowing of three web pages directed to the "baseball" subject. By comparing rows 1301, 1303, and 1307 show in FIG. 13 to rows 901, 903, and 907 shown in FIG. 9, it can be seen that, in these rows, the value "no" in the stowed column 914 shown in FIG. 9 has changed to the value "yes" in the stowed column 1314 shown in FIG. 13, to reflect that each of the web pages that has the entity "baseball" in its subject path column has been stowed.

Figure 14:
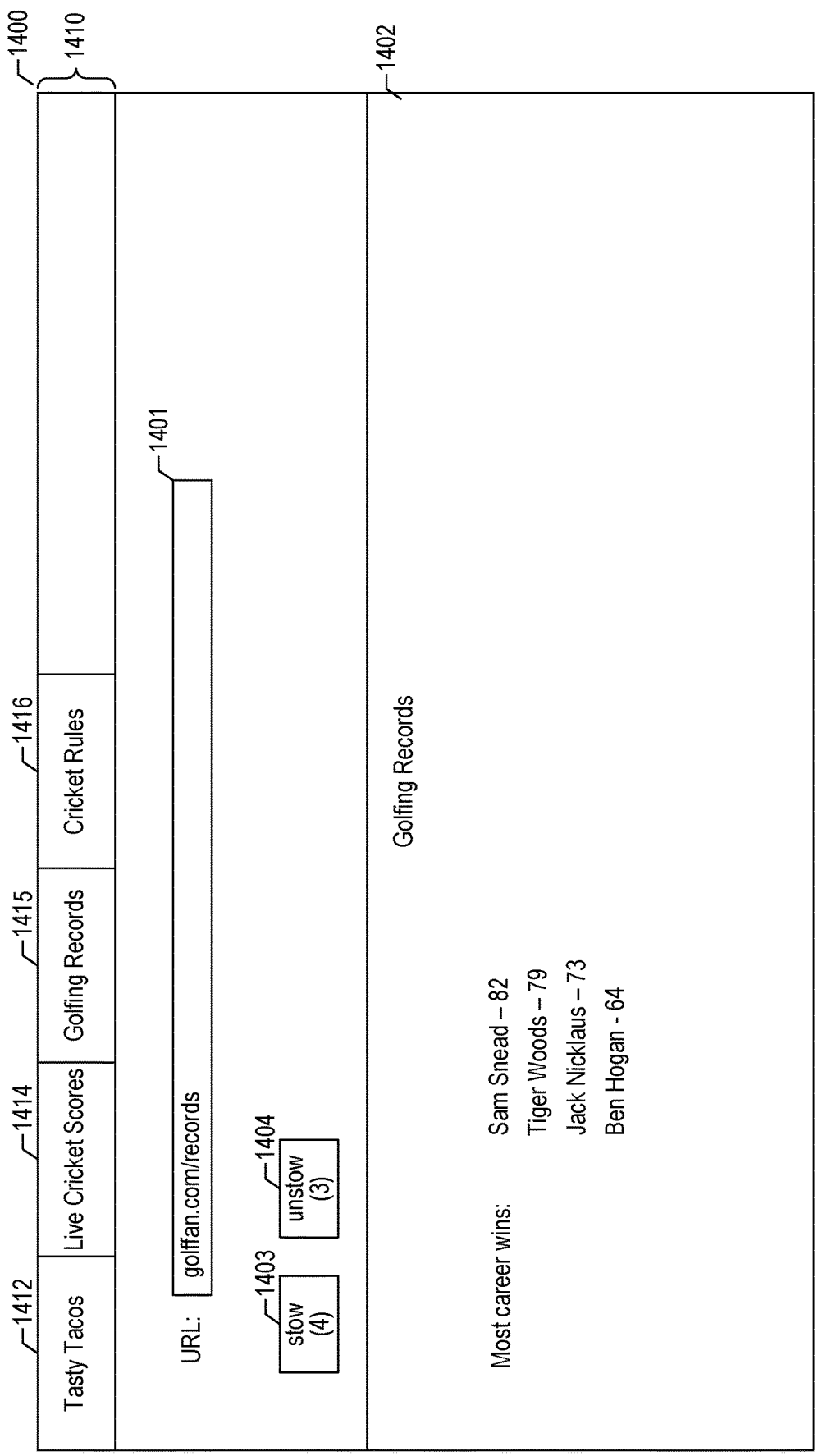
FIG. 14 is a user interface diagram showing a sample display presented by the facility in some examples to reflect the stowing of the three web pages directed to the "baseball" subject.

FIG. 14 is a user interface diagram showing a sample display presented by the facility in some examples to reflect the stowing of the three web pages directed to the "baseball" subject. By comparing the web page tab bar 1410 shown in FIG. 14 to the web page tab bar 1210 shown in FIG. 12, it can be seen that the following tabs, corresponding to pages directed to the "baseball" subject, have been removed from the web page tab bar: web page tabs 1211, 1213, and 1217. Also, by comparing browser stow and unstow controls 1403 and 1404 shown in FIG. 14 to the same controls 1203 and 1204 shown in FIG. 12, it can be seen that the number of loaded web pages available to stow has been reduced from seven to four, while the number of web pages available to unstow has increased from zero to three. Also, by comparing URL field 1401 and web page contents 1402 shown in FIG. 14 to URL field 1201 and web page contents 1202 in FIG. 12, it can be seen that, as part of stowing the "Baseball Greats" web page corresponding to web page tab 1211, the facility has replaced its display with a "Golfing Records" web page corresponding to web page tab 1415. In browser window 1400, the user can select any of the four displayed web page tabs 1412, 1414, 1415, and 1416 to display a context menu for the corresponding web page, such as by right-mouse-clicking on the tab, long-touching the tab, typing in a keystroke or keystroke combination, etc.

Returning to FIG. 10, where the user input received at 1001 is input that activates a page stow control for a particular page, at 1005, the facility solicits from the user a selection of a subject in the subject path of the page whose page stow control was activated. After 1005, the facility continues at 1004 to stow any pages not already stowed whose paths contain the subject selected at 1005.

Figure 15:
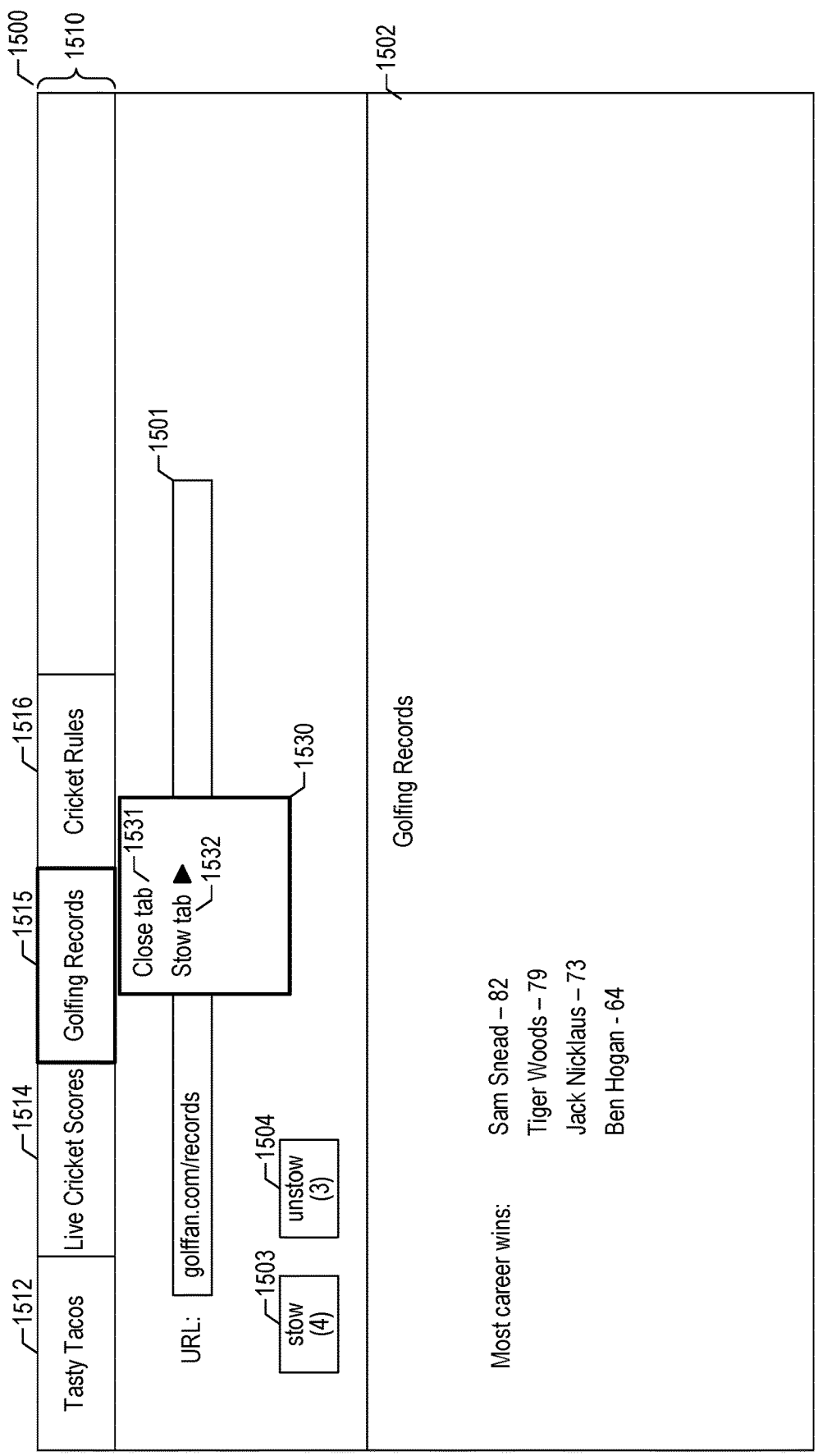
FIG. 15 is a user interface diagram showing a sample display presented by the facility in some examples to display a context menu for the web page tab corresponding to the "Golfing Records" web page.

FIG. 15 is a user interface diagram showing a sample display presented by the facility in some examples to display a context menu for the web page tab corresponding to the "Golfing Records" web page. It can be seen that, in browser window 1500, context menu 1530 has been displayed near Golfing Records tab 1515 in response to the user's selection of the golfing records tab. The context menu includes a Close Tab menu item 1531, and a Stow Tab menu item 1532. The user can select either of these menu items in any of the ways discussed above, for example.

Figure 16:
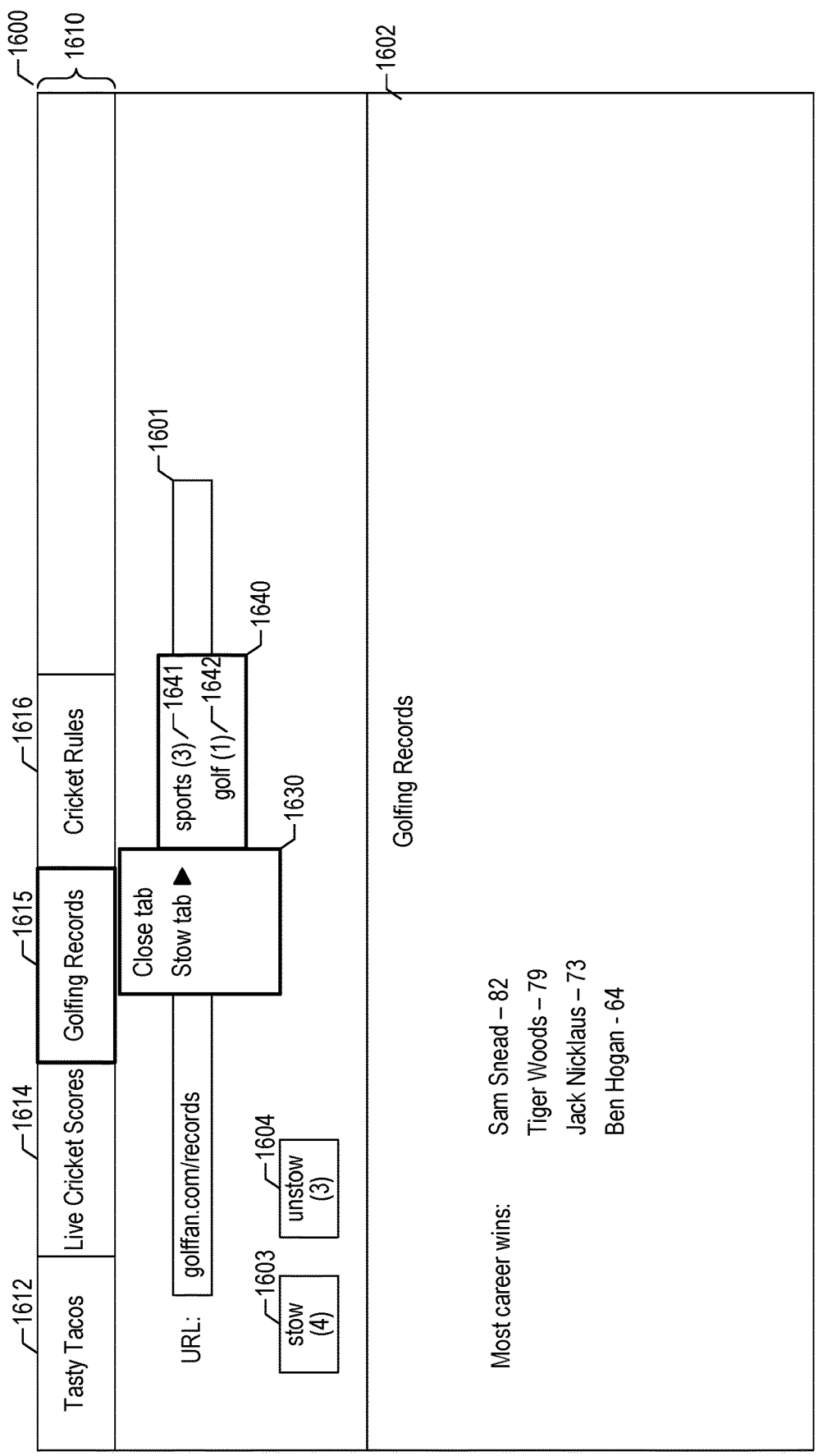
FIG. 16 is a display diagram showing a sample display presented by the facility in some examples in response to the user's selection of the stow tab menu item in the context menu for the "Golfing Records" web page tab.

FIG. 16 is a display diagram showing a sample display presented by the facility in some examples in response to the user's selection of the stow tab menu item in the context menu for the "Golfing Records" web page tab. It can be seen that the browser window 1600 now contains a context menu extension 1640 near context menu 1630. The context menu extension includes the two subjects in the subject path for the Golfing Records web page shown at the intersection of row 1305 and column 1313 in page stowing table 1300 shown in FIG. 13: a "sports" category 1041, having a count of three loaded web pages not already stowed; and a "golf" subject 1642, having a count of one loaded web page not already stowed. The user can select any of these displayed subjects using any of the techniques described above, for example.

FIG. 17 is a data structure diagram showing sample contents of the page stowing table updated to reflect the user's selection of the sports category from the Stow Tab context menu item extension shown in FIG. 16. It can be seen by comparing rows 1704-1706 shown in FIG. 17 to rows 1304-1306 shown in FIG. 13 that, in each of these rows, the value "no" in the stowed column 1314 shown in FIG. 13 has been changed to value "yes" in the stowed column 1714 shown in FIG. 17, reflecting the stowing of the three web pages to which these rows correspond.

Figure 18:
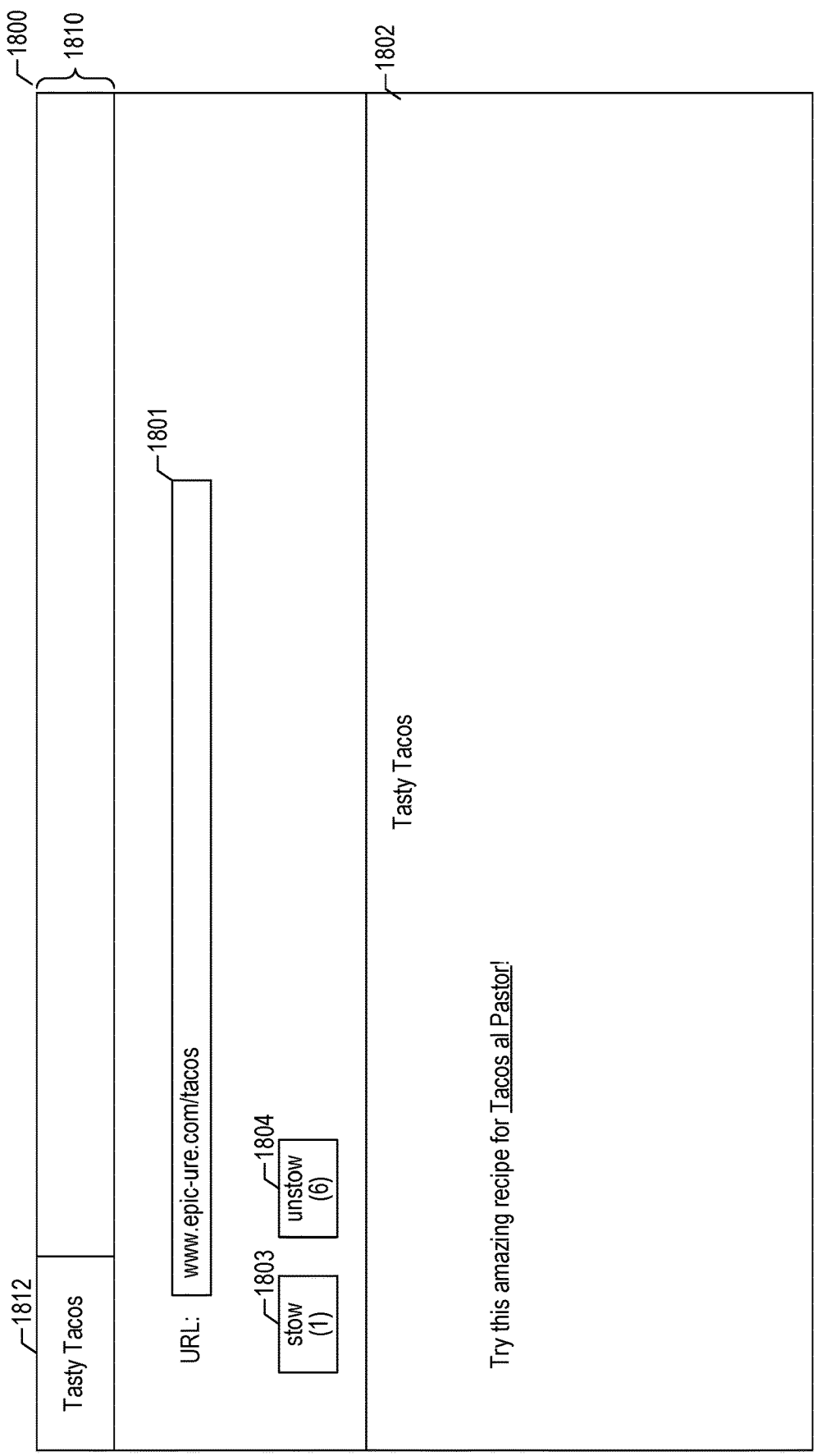
FIG. 18 is a user interface diagram showing a sample display presented by the facility in some examples to reflect the stowing of the remaining web pages having the "sports" subject.

FIG. 18 is a user interface diagram showing a sample display presented by the facility in some examples to reflect the stowing of the remaining web pages having the "sports" subject. By comparing web page tab bar 1810 shown in FIG. 18 to web page tab bar 1610 shown in FIG. 16, it can be seen that the facility has removed web page tabs 1614, 1615, and 1616, corresponding to the web pages having the "sports" subject. It can further be seen that the web page counts in browser stow and unstow controls 1803 and 1804 have been updated to reflect the stowing of three additional web pages. Finally, it can be seen that the URL field 1801 and web page contents 1802 have been updated to replace the URL in web page content for the "Golfing Records" web page, which has been stowed.

Returning to FIG. 10, when the user input received at 1010 is input that activates the browser on stow control, at 1006, the facility unions the subjects in the paths of the loaded web pages that are presently stowed. When the page stowing table has the contents shown in FIG. 17, the result of unioning these subjects is as follows: "baseball," "sports," "Willie Mays," "cricket," and "golf." (Row 1702, which has "no" in the stowed column, is skipped during the unioning process.) At 1007, the facility solicits the user's selection of a subject in the union obtained at 1006.

Figure 19:
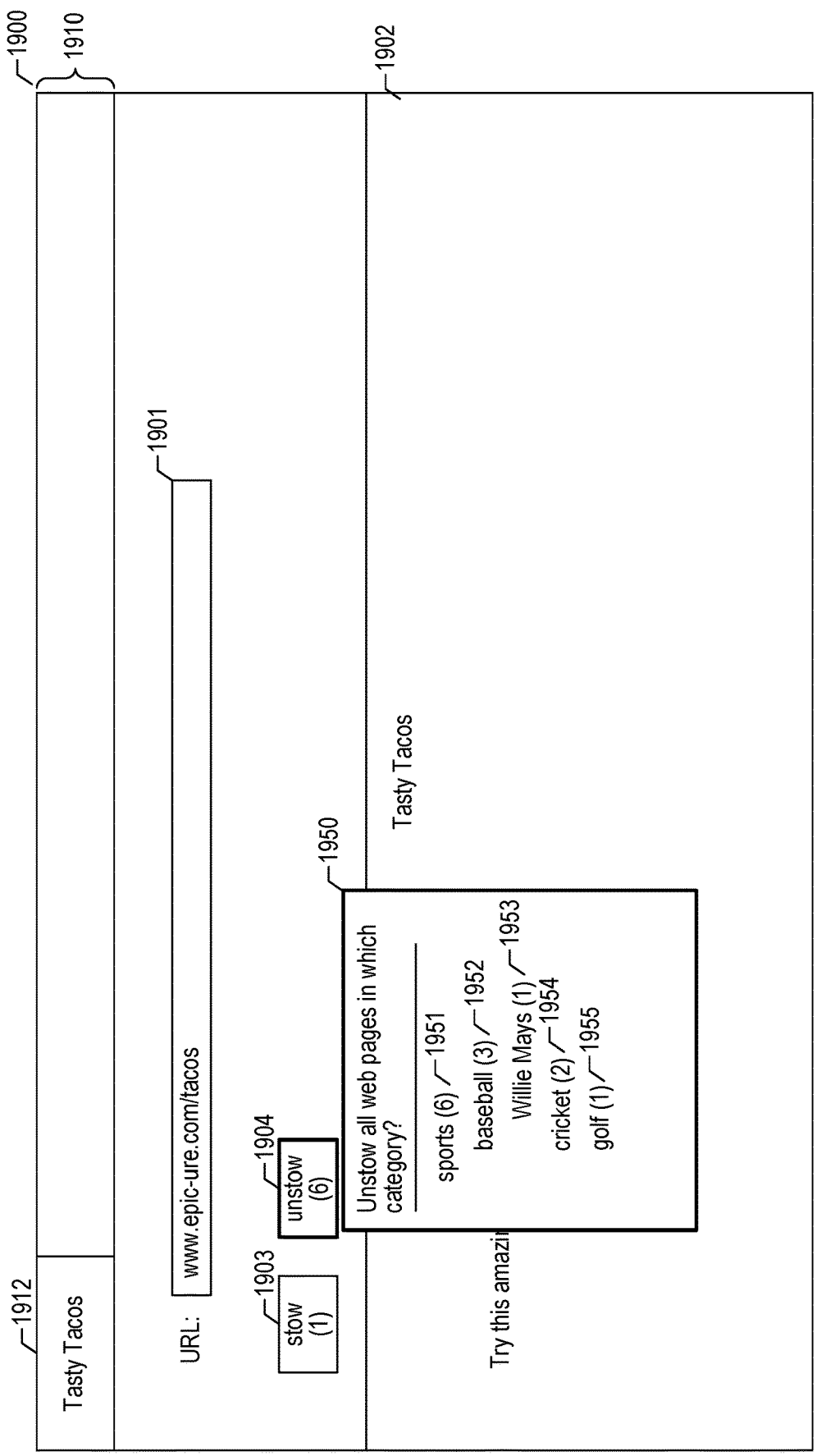
FIG. 19 is a user interface diagram showing sample contents of a display presented by the facility in some embodiments in response to the user's activation of the browser unstow control.

FIG. 19 is a user interface diagram showing sample contents of a display presented by the facility in some examples in response to the user's activation of the browser unstow control. In browser window 1900, it can be seen that a subject pane 1950 has been displayed near the browser unstow control 1904 activated by the user. This subject pane contains subjects 1951-1955 obtained by the facility's unioning at 1006. The user can select any of these subjects in order to unstow the loaded, stowed web pages having the selected subject.

Returning to FIG. 10, at 1008, the facility unstows the pages that are presently stowed whose paths contain the subject selected by the user at 1007. After 1008, the facility continues at 1001 to receive and process the next user input.

FIG. 20 is a data structure diagram showing sample contents of the page stowing table updated to reflect the unstowing of two web pages having the "cricket" subject in response to the user's selection of the cricket subject shown in FIG. 19. By comparing rows 2004 and 2006 shown in FIG. 20 to rows 1704 and 1706 shown in FIG. 17, it can be seen that the value in the stowed column has changed from "yes" to "no" for these two web pages that have the subject "cricket" in their subject paths.

Figure 21:
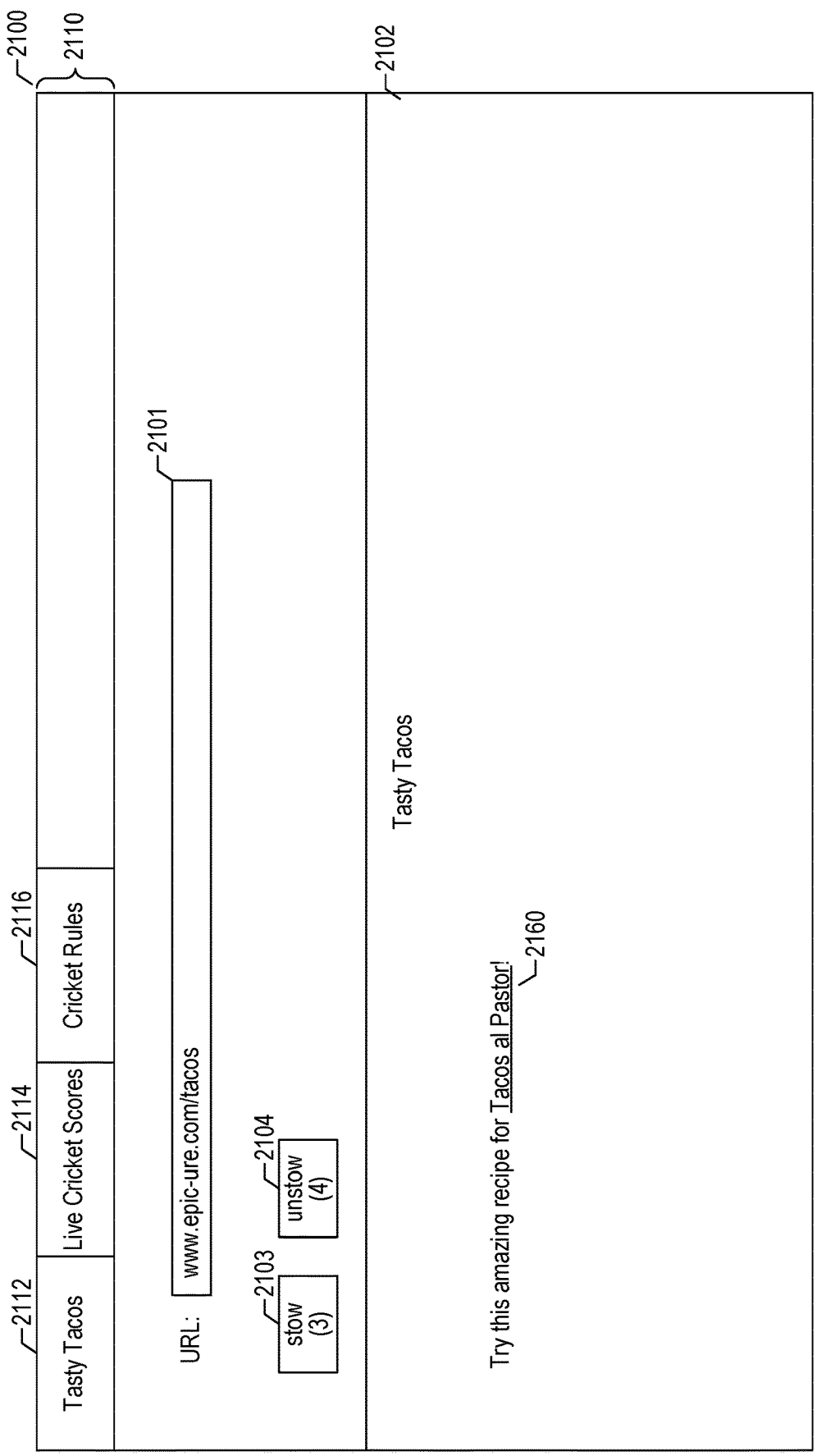
FIG. 21 is a user interface diagram showing a sample display presented by the facility in some examples to reflect the unstowing of two web pages having the "cricket" subject.

FIG. 21 is a user interface diagram showing a sample display presented by the facility in some examples to reflect the unstowing of two web pages having the "cricket" subject. By comparing web page tab bar 2110 shown in FIG. 21 with web page tab bar 1910 shown in FIG. 19, it can be seen that the facility has restored web page tabs 2114 and 2116, corresponding to the two web pages having the "cricket" subject. Similarly, the web page counts shown in browser stow control 2103 and browser unstow control 2104 have been updated to reflect the unstowing of two web pages.

Returning to FIG. 10, when the user input received at 1001 is input activating an Open and Stow control for a link to a web page, at 1009, the facility loads the page at the link. At 1010, the facility stows the page loaded at 1009, in some cases without ever displaying it. After 1010, the facility continues at 1001 to receive and process the next user input.

Figure 22:
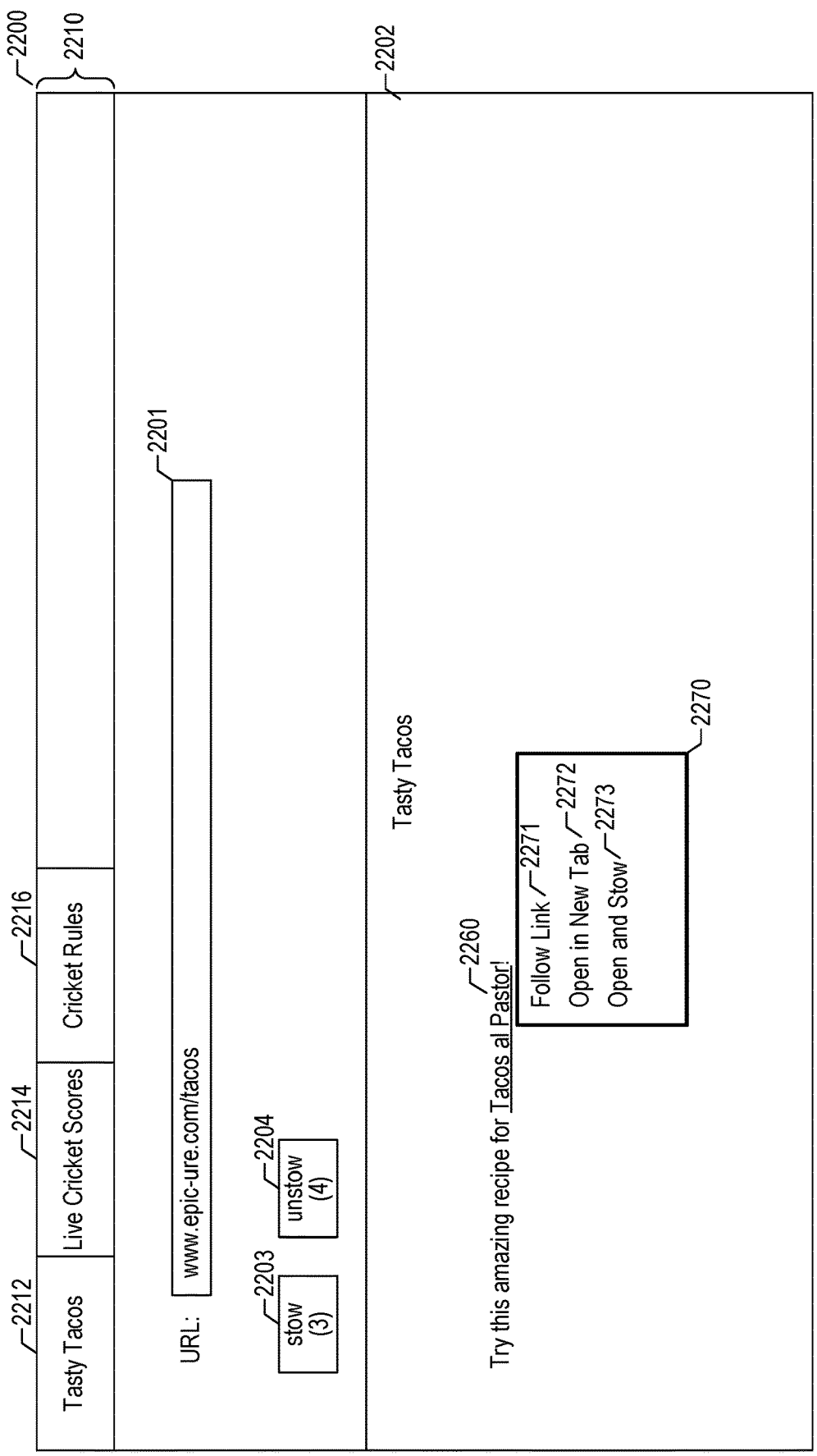
FIG. 22 is a user interface diagram showing sample contents of a display presented by the facility in some examples to reflect the user's selection of a link to a web page.

FIG. 22 is a user interface diagram showing sample contents of a display presented by the facility in some examples to reflect the user's selection of a link to a web page. In browser window 2200, it can be seen that, in response to the user's selection of link 2160 shown in FIG. 21, the facility has displayed a context menu 2270. The context menu includes the following menu items: a Follow Link menu item 2271, an Open in New Tab menu item 2272, and an Open and Stow menu item 2273. The user can select any of these in any of the ways described above, for example.

FIG. 23 is a data structure diagram showing sample contents of the page stowing table updated to reflect activation of the Open and Stow control for a link. By comparing page stowing table 2300 shown in FIG. 23 to page stowing table 2000 shown in FIG. 20, it can be seen that the facility has added row 2308 corresponding to the web page that is the subject of link 2260 shown in FIG. 22. It can also be seen that, at the intersection of this new row with the stowed column, 2314, is the value "yes," indicating that this web page is presently stowed.

Figure 24:
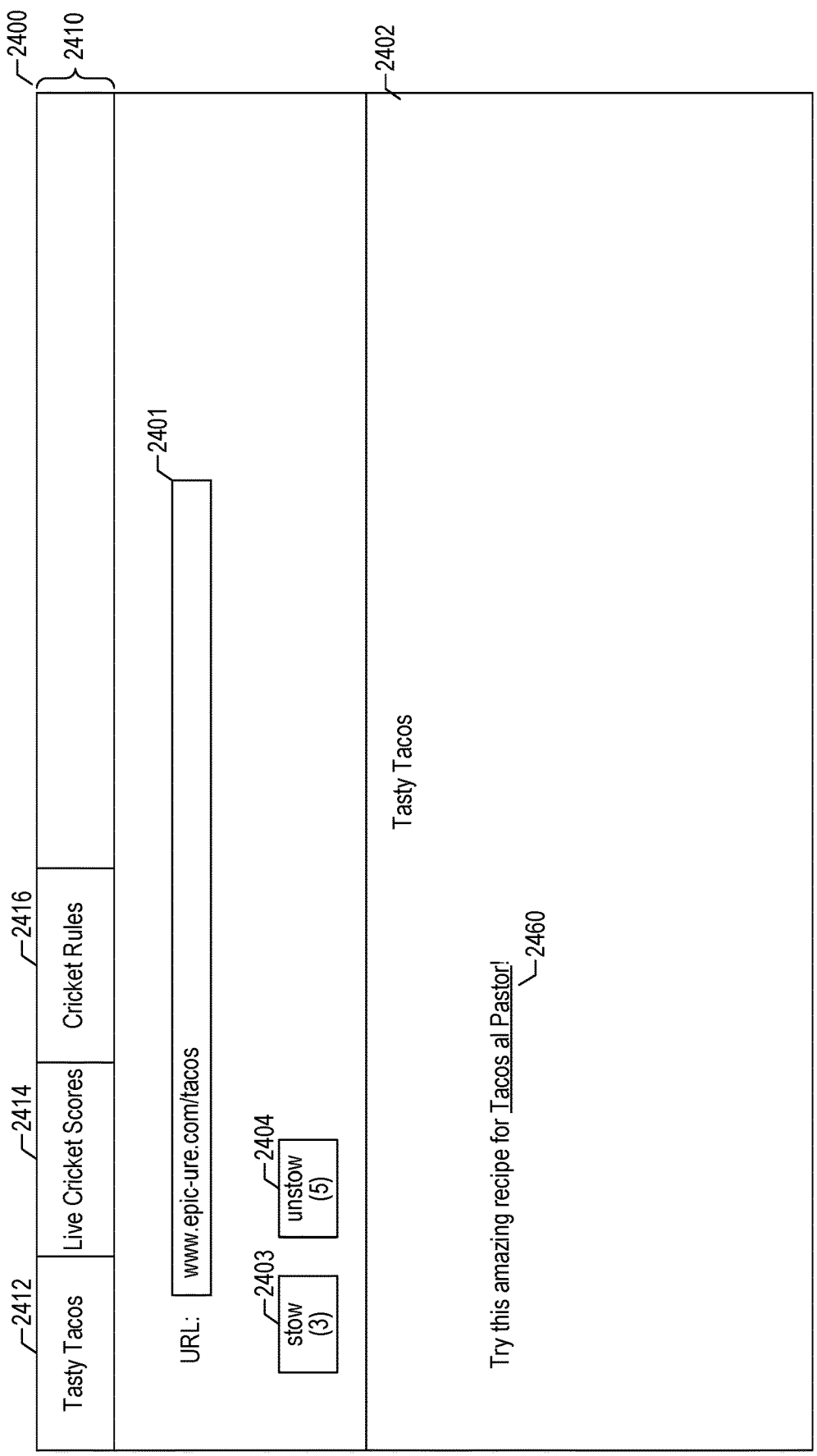
FIG. 24 is a user interface diagram showing a sample display presented by the facility in some examples to reflect the opening and stowing of a web page in connection with its link.

FIG. 24 is a user interface diagram showing a sample display presented by the facility in some examples to reflect the opening and stowing of a web page in connection with its link. By comparing browser window 2400 shown in FIG. 24 to browser window 2200 shown in FIG. 22, it can be seen that the browser on stow control 2404 has been updated to increase the number of web pages that can be unstowed from four to five.

Figure 25:
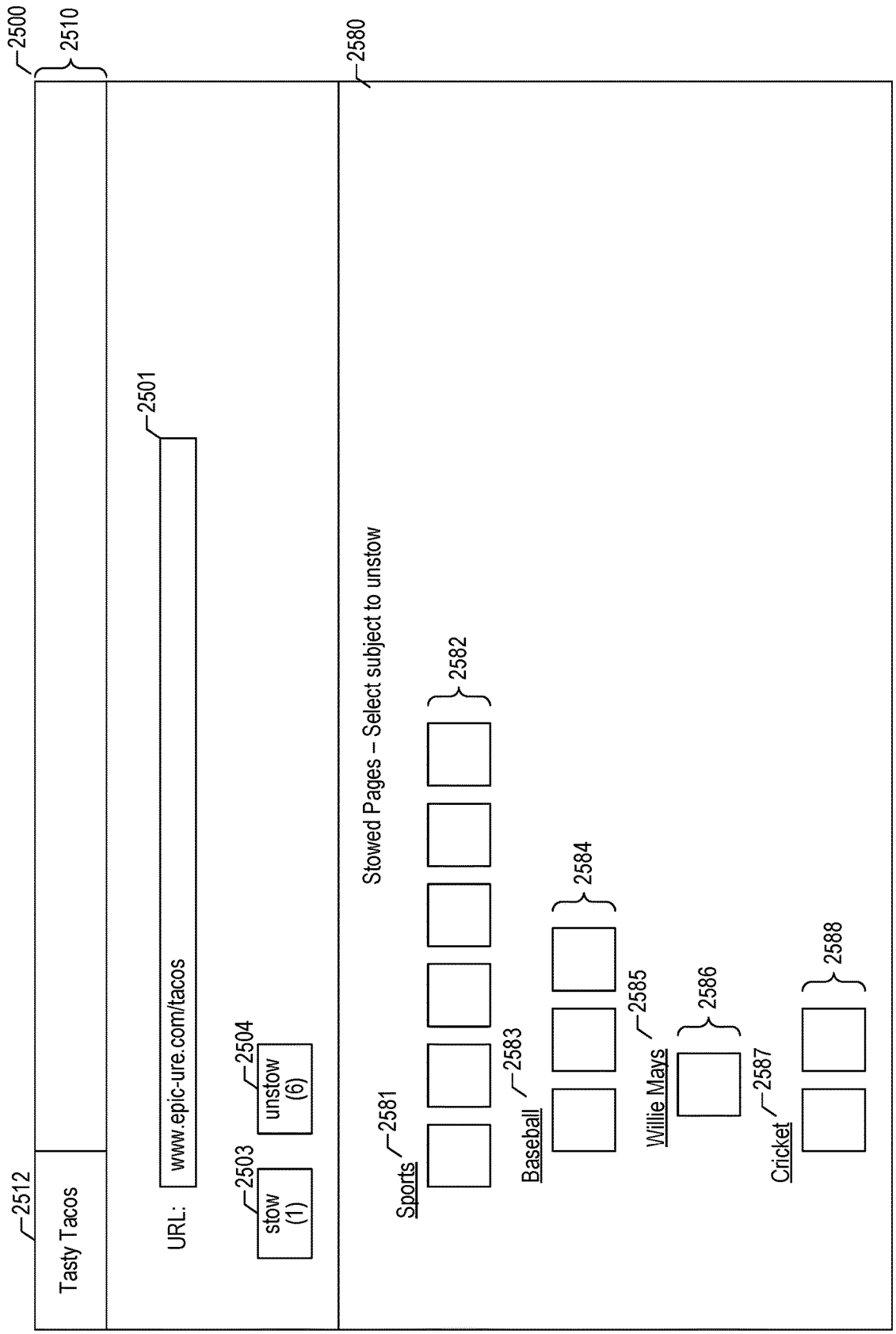
FIG. 25 is a user interface diagram showing an alternate display reflecting the user's activation of the browser unstow control 1804 shown in FIG. 18.

FIG. 25 is a user interface diagram showing an alternate display reflecting the user's activation of the browser unstow control 1804 shown in FIG. 18. By comparing browser window 2500 shown in FIG. 25 to browser window 1900 shown in FIG. 19, it can be seen that a larger display individually representing the stowed web pages is shown in browser window 2500 shown in FIG. 25. In browser area 2580, subjects 2581, 2583, 2585, and 2587, for example, corresponding to stowed web pages are displayed. Under each, individual representations of the stowed web pages having that subject—such as thumbnail images of these web pages—e.g., individual representations 2582, 2584, 2586, and 2588. In various examples, the user can select any of the category names in order to unstow the web pages having that category; select one or more individual web page representations in order to unstow only those web pages, etc. In some examples, in response to each such unstowing operation, the facility updates area 2580 to remove the individual representations of unstowed web pages; remove the category name for any category that is no longer represented among the remaining stowed web pages; update the web page tab bar 2510 to add tabs for the unstowed web pages; and update the web page counts on browser stow control 2503 and browser unstow control 2504 (not shown).

In some examples (not shown), at some or all points when the facility displays the name of a subject, the facility displays an icon that visually represents the subject near its name (or in place of its name).

In some examples, the facility provides a method in a computing system for managing web pages loaded by a web browser, comprising: for each of a plurality of web pages loaded in the web browser: based on the contents of the web page, semantically determining one or more subjects of the web page; for each of the determined subjects, displaying a visual indication of the determined subject; receiving user input selecting one of the displayed visual indications; and hiding the web pages among the loaded web pages for which the subject indicated by the selected visual indication was semantically determined.

In some examples, the facility provides a computing system for managing the display of documents by an application, comprising: a processor; and a memory having contents whose execution by the processor cause the computing system to perform a method, the method comprising: for each of a plurality of web pages loaded in the web browser: based on the contents of the web page, semantically determining one or more subjects of the web page; for each of the determined subjects, displaying a visual indication of the determined subject; receiving user input selecting one of the displayed visual indications; and hiding the web pages among the loaded web pages for which the subject indicated by the selected visual indication was semantically determined.

In some examples, the facility provides a memory having contents configured to cause a computing system to perform a method for managing web pages loaded by a web browser, the method comprising: for each of a plurality of web pages loaded in the web browser: based on the contents of the web page, semantically determining one or more subjects of the web page; for each of the determined subjects, displaying a visual indication of the determined subject; receiving user input selecting one of the displayed visual indications; and hiding the web pages among the loaded web pages for which the subject indicated by the selected visual indication was semantically determined.

In some examples, the facility provides a method in a computing system for managing the displayed documents by an application, the method comprising: displaying a plurality of tabs each corresponding to a document loaded by the application; receiving a document stowing command in connection with a distinguished document to which one of the displayed tabs corresponds; for each of the documents to which a displayed tab corresponds: based on the contents of the document, semantically determining one or more subjects of the distinguished document; at least in part in response to receiving the document stowing command in connection with the distinguished document: for each of two or more subjects determined for the distinguished document, displaying a visual indication of the determined subject; receiving user input selecting one of the displayed visual indications; and hiding the tabs corresponding to the documents for which the subject indicated by the selected visual indication was semantically determined.

In some examples, the facility provides a computing system for managing the display of documents by an application, comprising: a processor; and a memory having contents whose execution by the processor cause the computing system to perform a method, the method comprising: displaying a plurality of tabs each corresponding to a document loaded by the application; receiving a document stowing command in connection with a distinguished document to which one of the displayed tabs corresponds; for each of the documents to which a displayed tab corresponds: based on the contents of the document, semantically determining one or more subjects of the distinguished document; at least in part in response to receiving the document stowing command in connection with the distinguished document: for each of two or more subjects determined for the distinguished document, displaying a visual indication of the determined subject; receiving user input selecting one of the displayed visual indications; and hiding the tabs corresponding to the documents for which the subject indicated by the selected visual indication was semantically determined.

In some examples, the facility provides a memory having contents configured to cause a computing system to perform a method for managing the displayed documents by an application, the method comprising: displaying a plurality of tabs each corresponding to a document loaded by the application; receiving a document stowing command in connection with a distinguished document to which one of the displayed tabs corresponds; for each of the documents to which a displayed tab corresponds: based on the contents of the document, semantically determining one or more subjects of the distinguished document; at least in part in response to receiving the document stowing command in connection with the distinguished document: for each of two or more subjects determined for the distinguished document, displaying a visual indication of the determined subject; receiving user input selecting one of the displayed visual indications; and hiding the tabs corresponding to the documents for which the subject indicated by the selected visual indication was semantically determined.

In some examples, the facility provides a method in a computing system for managing web pages loaded by a web browser, the method comprising: displaying tabs each corresponding to a different one of a proper subset of the web pages loaded by the web browser; for each web page loaded by the web browser not in the proper subset: based on the contents of the web page, semantically determining one or more subjects of the web page; for each of the determined subjects, displaying a visual indication of the determined subject; receiving user input selecting one of the displayed visual indications; and displaying additional tabs each corresponding to a different one of the web pages not in the proper subset for which the subject indicated by the selected visual indication was semantically determined.

In some examples, the facility provides a computing system for managing web pages loaded by a web browser, comprising: a processor; and a memory having contents whose execution by the processor cause the computing system to perform a method, the method comprising: displaying tabs each corresponding to a different one of a proper subset of the web pages loaded by the web browser; for each web page loaded by the web browser not in the proper subset: based on the contents of the web page, semantically determining one or more subjects of the web page; for each of the determined subjects, displaying a visual indication of the determined subject; receiving user input selecting one of the displayed visual indications; and displaying additional tabs each corresponding to a different one of the web pages not in the proper subset for which the subject indicated by the selected visual indication was semantically determined.

In some examples, the facility provides a memory having contents configured to cause a computing system to perform a method for managing web pages loaded by a web browser, the method comprising: displaying tabs each corresponding to a different one of a proper subset of the web pages loaded by the web browser; for each web page loaded by the web browser not in the proper subset: based on the contents of the web page, semantically determining one or more subjects of the web page; for each of the determined subjects, displaying a visual indication of the determined subject; receiving user input selecting one of the displayed visual indications; and displaying additional tabs each corresponding to a different one of the web pages not in the proper subset for which the subject indicated by the selected visual indication was semantically determined.

In some examples, the facility provides a memory storing a tab hiding data structure representing state of a browser, the data structure comprising: a plurality of entries each corresponding to a web page loaded by the browser, each entry comprising: information identifying one or more subjects attributed to the web page; and an indication of whether a tab is presently being displayed for the web page by the browser, such that the contents of the data structure are usable to hide or unhide tabs for loaded web pages on the basis of the subjects attributed to the loaded web pages.

It will be appreciated by those skilled in the art that the above-described facility may be straightforwardly adapted or extended in various ways. While the foregoing description makes reference to particular examples, the scope of the invention is defined solely by the claims that follow and the elements recited therein.

We claim:

1. A method for managing web pages loaded by a web browser, comprising:
   for each of a plurality of web pages currently loaded in the web browser:
     based on contents of the web page, semantically determining one or more subjects of the web page;
   for each of the one or more determined subjects, displaying a visual indication of the one or more determined subjects, and for each displayed visual indication of each determined subject, displaying a count for a number of the currently loaded web pages for which a subject indicated by the displayed visual indication was semantically determined;
   receiving user input selecting one of the displayed visual indications of the determined subject; and
   in response to receiving user input selecting one of the displayed visual indications of one of the determined subject, hiding one or more of the currently loaded web pages for which the subject indicated by the selected visual indication was semantically determined.

2. The method of claim 1, wherein based on the contents of the web page, semantically determining one or more subjects or each of the plurality of web pages comprises:

identifying one or more named entities referenced by the web page;

for each of the identified one or more named entities, obtaining an entity relationship graph representing relationships between the identified named entity and named entities directly or indirectly related to the identified named entity, the identified named entity being a root of the graph, a proper subset of nodes of the graph, including the root, each having one or more children;

selecting an entity occurring in at least some of the entity relationship graphs obtained for named entities referenced by the web page; and attributing the selected entity as a subject of the web page.

3. The method of claim 1, wherein based on the contents of the web page, semantically determining one or more subjects of each of the plurality of web pages comprises:

identifying one or more named entities referenced by the web page;

for each of the identified one or more named entities, obtaining an entity relationship graph representing relationships between the identified named entity and named entities directly or indirectly related to the identified named entity, the identified named entity being a root of the graph, a proper subset of nodes of the graph, including the root, each having one or more children;

selecting an entity occurring in at least some of the entity relationship graphs obtained for named entities referenced by the web page; and attributing as subjects of the web page the selected entity and each of its descendent nodes.

4. The method of claim 1 wherein the displaying is performed based at least in part on receiving user input activating a displayed button, further comprising displaying the button with a numerical indication of a number of loaded web pages that are not hidden, and are therefore available for hiding.

5. The method of claim 1, further comprising:

for each hidden web page:
  based on the contents of the web page, semantically determining one or more subjects of the web page;
for each of the determined subjects, displaying the visual indication of the determined subject;
receiving user input selecting one of the displayed visual indications; and
unhiding one or more of the hidden web pages for which the subject indicated by the selected visual indication was semantically determined.

6. The method of claim 1, further comprising, for each displayed visual indication of the determined subject, displaying an icon visually portraying the determined subject.

7. The method of claim 1, wherein the displayed visual indications of determined subjects are displayed in a hierarchical arrangement.

8. The method of claim 1, further comprising:

displaying contents of a loaded web page that is not hidden, the contents including a link to a distinguished web page;
receiving user input selecting the included link; and
at least in part based upon the received user input selecting the included link:
  loading the distinguished web page; and
  hiding the distinguished web page before contents of the distinguished web page are displayed.

9. The method of claim 8, further comprising:

at least in part based upon the received user input selecting the included link, displaying a context menu in connection with the included link, the context menu including one or more menu items including a menu item corresponding to a load and stow command; and
receiving user input selecting the menu item corresponding to the load and stow command;
wherein the loading and hiding of the distinguished web page is performed at least in part based upon receiving user input selecting the menu item corresponding to the load and stow command.

10. The method of claim 8, wherein the received user input selecting the included link comprises a mouse click in a proximity of the included link at a time proximate to that in which a particular keystroke is performed.

11. The method of claim 1, wherein the displayed visual indications include a direct determined subject and one or more other determined subjects that descend from the direct determined subject.

12. The method of claim 11, wherein the displayed visual indications are displayed in a hierarchical arrangement that positions the direct determined subject at a root and the one or more other determined subjects at one or more leaf positions of the root.

13. A computing system for managing a display of documents by an application, comprising:

a processor; and
a memory for storing executable instructions for causing the processor to perform functions of:
  displaying a plurality of tabs each corresponding to a document currently loaded by the application;
  receiving user input comprising a document stowing command in connection with a distinguished document to which one of the displayed tabs corresponds;
  for each document to which a displayed tab corresponds, based on contents of the distinguished document, semantically determining one or more subjects of the distinguished document;
  at least in part in response to receiving the document stowing command in connection with the distinguished document:
    for each of two or more subjects determined for the distinguished document, displaying a visual indication of the determined subject;
    receiving user input selecting one of the displayed visual indications of the determined subject; and
    in response to receiving the user input selecting the one of the displayed visual indications of the two or more determined subjects, hiding one or more tabs corresponding to one or more documents for which the two or more determined subjects indicated by the selected visual indication was semantically determined.

14. The computing system of claim 13, wherein the memory further stores executable instructions for causing the processor to perform a function of displaying a document stowing control in connection with contents of the distinguished document, wherein the received document stowing command is user input activating the displayed document stowing control.

15. The computing system of claim 13, wherein the memory further stores executable instructions for causing the processor to perform a function of:

receiving user input selecting the displayed tab corresponding to the distinguished document; and
at least in part based upon receiving user input selecting the displayed tab corresponding to the distinguished document, displaying a context menu in connection with the selected displayed tab, the context menu having menu items including a page stowing menu item, wherein the received document stowing command is user input selecting the page stowing menu item.

16. A non-transitory computer readable medium storing executable instructions for causing a computing system to perform a method for managing a plurality of web pages currently loaded by a web browser, the method comprising:

displaying a first set of tabs, each tab corresponding to a different web page currently loaded in the web browser, the first set of tabs comprising one or more subsets of the plurality of web pages currently loaded by the web browser, wherein a subset of web pages currently loaded in the web browser is a set of less than all of the plurality of web pages currently loaded in the web browser;

for each one of the different web pages loaded by the web browser that are not in the one or more subsets, based on contents of each one web page, semantically determining one or more subjects of the each one web page;

for each one of the determined one or more subjects, displaying a visual indication of the determined subject;

receiving user input selecting one of the displayed visual indications of the determined subject; and responsive to receiving the user input selecting one of the displayed visual indications of the determined subject, displaying one or more additional tabs, each one of the one or more additional tabs corresponding to a different web page of the plurality of the currently loaded web pages that is not in the one or more subsets.

17. The non-transitory computer readable medium of claim 16, wherein the method further comprises:

for each web page loaded by the web browser for which a tab is displayed:

based on the contents of the web page, semantically determining one or more subjects of the web page;

for each of the determined one or more subjects, displaying the visual indication of the determined subject;

receiving user input selecting one of the displayed visual indications; and removing from display one or more tabs corresponding to one or more web pages for which the determined subject indicated by the selected visual indication was semantically determined.

18. The non-transitory computer readable medium of claim 16, wherein the displaying of visual indications is performed based at least in part on receiving user input activating a displayed button, the method further comprising displaying the button with a numerical indication of a number of loaded web pages that are not in the one or more subsets, and are therefore available for unhiding.

19. The non-transitory computer readable medium of claim 16, the method further comprising:

in connection with each displayed visual indication of the determined subject:

for each of the web pages for which the determined subject was semantically determined that is not in the one or more subsets, displaying a thumbnail visual representation of the web page.

20. The non-transitory computer readable medium of claim 16, wherein the displayed visual indications of determined subjects are displayed in a hierarchical arrangement, the method further comprising, in connection with each displayed visual indication of a determined subject, displaying a numerical indication of a number of the web pages for which the determined subject was semantically determined that is not in the one or more sub sets.

21. The non-transitory computer readable medium of claim 16, the method further comprising, for each displayed visual indication of the determined subject, displaying an icon visually portraying the determined subject.

* * * * *